United States Patent
Vymenets et al.

(10) Patent No.: US 12,198,103 B2
(45) Date of Patent: Jan. 14, 2025

(54) SYSTEM AND METHOD FOR DISPLAYING MESSAGE HISTORY WHEN COMPOSING A MESSAGE

(71) Applicant: Malikie Innovations Limited, Dublin (IE)

(72) Inventors: Leonid Vymenets, Toronto (CA); Francis Thomas Riddle, Portsmouth, NH (US); Henry Yao-Tsu Chen, Redmond, WA (US)

(73) Assignee: Malikie Innovations Limited, Dublin (IE)

( * ) Notice: Subject to any disclaimer, the term of this patent is extended or adjusted under 35 U.S.C. 154(b) by 18 days.

(21) Appl. No.: 18/045,370

(22) Filed: Oct. 10, 2022

(65) Prior Publication Data

US 2023/0110143 A1    Apr. 13, 2023

Related U.S. Application Data

(63) Continuation of application No. 13/295,404, filed on Nov. 14, 2011, now abandoned.

(51) Int. Cl.
*G06F 3/0484* (2022.01)
*G06F 40/10* (2020.01)
*G06Q 10/107* (2023.01)

(52) U.S. Cl.
CPC ......... *G06Q 10/107* (2013.01); *G06F 3/0484* (2013.01); *G06F 40/10* (2020.01)

(58) Field of Classification Search
CPC .... G06F 3/0481; G06F 3/0482; G06F 3/0484; G06F 3/04842; G06F 40/10; G06Q 10/107
See application file for complete search history.

(56) References Cited

U.S. PATENT DOCUMENTS

| | | |
|---|---|---|
| 7,328,242 B1 | 2/2008 | McCarthy et al. |
| 8,001,181 B2 | 8/2011 | Wilson et al. |

(Continued)

FOREIGN PATENT DOCUMENTS

| | | |
|---|---|---|
| EP | 1271286 A2 | 1/2003 |
| EP | 2381402 A1 | 10/2011 |

(Continued)

OTHER PUBLICATIONS

Lee, Rob; "Group Messaging—iPhone iOS4 Does—Android 2.1 Doesn't"; retrieved from https://www.youtube.com/watch?v=pXbPTjOXjE8; Jul. 19, 2010; 6 pages.

(Continued)

*Primary Examiner* — Kavita Stanley
*Assistant Examiner* — William Wong
(74) *Attorney, Agent, or Firm* — Conley Rose, P.C.; J. Robert Brown, Jr.

(57) ABSTRACT

A system and a method are provided for displaying message history while composing a message. The method includes displaying a message composition application comprising a first recipient field, a message history display area, and a message composition field; detecting an input into the first recipient field for specifying a recipient; and upon detecting that the recipient has been specified: displaying a second recipient field; navigating application focus from the first recipient field to the second recipient field; and displaying a message history associated with the recipient in the message history display area.

15 Claims, 20 Drawing Sheets

(56) References Cited

U.S. PATENT DOCUMENTS

| | | | |
|---|---|---|---|
| 8,754,572 | B2 | 6/2014 | Behforooz et al. |
| 2002/0023128 | A1 | 2/2002 | Matsumoto et al. |
| 2003/0146939 | A1 | 8/2003 | Petropoulos et al. |
| 2004/0015548 | A1 | 1/2004 | Lee |
| 2004/0015553 | A1 | 1/2004 | Griffin et al. |
| 2004/0137884 | A1 | 7/2004 | Engstrom et al. |
| 2005/0091612 | A1 | 4/2005 | Stabb et al. |
| 2005/0166154 | A1 | 7/2005 | Wilson et al. |
| 2005/0203929 | A1 | 9/2005 | Hazarika et al. |
| 2006/0116164 | A1 | 6/2006 | Kang |
| 2006/0128404 | A1 | 6/2006 | Klassen et al. |
| 2006/0197753 | A1 | 9/2006 | Hotelling |
| 2006/0217965 | A1 | 9/2006 | Babu |
| 2006/0221957 | A1 | 10/2006 | Ozawa et al. |
| 2006/0288298 | A1 | 12/2006 | Haitani et al. |
| 2007/0005715 | A1 | 1/2007 | LeVasseur et al. |
| 2007/0198474 | A1 | 8/2007 | Davidson et al. |
| 2007/0242061 | A1 | 10/2007 | Rhoten et al. |
| 2007/0245006 | A1 | 10/2007 | Lehikoinen et al. |
| 2007/0280179 | A1* | 12/2007 | Van Belle ........... H04M 1/2748 370/338 |
| 2007/0283044 | A1 | 12/2007 | Van Bell et al. |
| 2008/0040437 | A1 | 2/2008 | Agarwal et al. |
| 2008/0153459 | A1 | 6/2008 | Kansal et al. |
| 2008/0222118 | A1 | 9/2008 | Scian et al. |
| 2008/0250107 | A1 | 10/2008 | Holzer et al. |
| 2008/0307322 | A1 | 12/2008 | Stochosky et al. |
| 2009/0005011 | A1 | 1/2009 | Christie et al. |
| 2009/0007012 | A1 | 1/2009 | Mandic et al. |
| 2009/0037413 | A1 | 2/2009 | Castell et al. |
| 2009/0061825 | A1 | 3/2009 | Neelakantan et al. |
| 2009/0177617 | A1 | 7/2009 | Lee |
| 2009/0177981 | A1 | 7/2009 | Christie et al. |
| 2010/0100852 | A1 | 4/2010 | Buchanan |
| 2010/0162133 | A1 | 6/2010 | Pascal et al. |
| 2010/0217808 | A1 | 8/2010 | Benninger |
| 2010/0217809 | A1 | 8/2010 | Vymenets et al. |
| 2010/0223547 | A1 | 9/2010 | Wilson et al. |
| 2010/0235523 | A1 | 9/2010 | Garcia et al. |
| 2010/0267369 | A1 | 10/2010 | Lim et al. |
| 2011/0087970 | A1 | 4/2011 | Swink et al. |
| 2011/0179126 | A1* | 7/2011 | Wetherell ............ H04W 24/10 709/206 |
| 2011/0230178 | A1 | 9/2011 | Jones et al. |
| 2011/0252317 | A1 | 10/2011 | Keranen et al. |
| 2012/0077469 | A1 | 3/2012 | Bhogal et al. |
| 2012/0331405 | A1 | 12/2012 | Eidelson et al. |
| 2013/0055111 | A1 | 2/2013 | Peyton et al. |
| 2013/0125019 | A1 | 5/2013 | Vymenets et al. |

FOREIGN PATENT DOCUMENTS

| | | |
|---|---|---|
| EP | 2385689 A1 | 11/2011 |
| WO | 2006043977 A1 | 4/2006 |

OTHER PUBLICATIONS

Office Action dated Nov. 7, 2014; U.S. Appl. No. 13/295,404, filed Nov. 14, 2011; 23 pages.
Final Office Action dated Jun. 22, 2015; U.S. Appl. No. 13/295,404, filed Nov. 14, 2011; 26 pages.
Advisory Action dated Sep. 18, 2015; U.S. Appl. No. 13/295,404, filed Nov. 14, 2011; 4 pages.
Office Action dated Nov. 17, 2015; U.S. Appl. No. 13/295,404, filed Nov. 14, 2011; 23 pages.
Final Office Action dated Jun. 20, 2016; U.S. Appl. No. 13/295,404, filed Nov. 14, 2011; 18 pages.
Advisory Action dated Sep. 19, 2016; U.S. Appl. No. 13/295,404, filed Nov. 14, 2011; 4 pages.
Office Action dated Oct. 21, 2016; U.S. Appl. No. 13/295,404, filed Nov. 14, 2011; 16 pages.
Final Office Action dated May 18, 2017; U.S. Appl. No. 13/295,404, filed Nov. 14, 2011; 16 pages.
Advisory Action dated Aug. 10, 2017; U.S. Appl. No. 13/295,404, filed Nov. 14, 2011; 5 pages.
Office Action dated Dec. 21, 2017; U.S. Appl. No. 13/295,404, filed Nov. 14, 2011; 16 pages.
Final Office Action dated Jul. 13, 2018; U.S. Appl. No. 13/295,404, filed Nov. 14, 2011; 19 pages.
Advisory Action dated Oct. 2, 2018; U.S. Appl. No. 13/295,404, filed Nov. 14, 2011; 4 pages.
Office Action dated Dec. 13, 2018; U.S. Appl. No. 13/295,404, filed Nov. 14, 2011; 18 pages.
Office Action dated Jun. 17, 2019; U.S. Appl. No. 13/295,404, filed Nov. 14, 2011; 18 pages.
Final Office Action dated Dec. 30, 2019; U.S. Appl. No. 13/295,404, filed Nov. 14, 2011; 23 pages.
European Extended Search Report; Application No. 11189060.4; Apr. 11, 2012; 7 pages.
PCT International Search Report & Written Opinion of the International Searching Authority; PCT/CA2011/050702; Aug. 3, 2012; 6 pages.
European Extended Search Report; Application No. 12156348.0; Jul. 20, 2012; 9 pages.
European Examination Report; Application No. 12156348.0; Jan. 26, 2016; 6 pages.
European Examination Report; Application No. 12156348.0; Aug. 23, 2017; 8 pages.
Canadian Office Action; Application No. 2,806,906; Sep. 4, 2014; 5 pages.
Canadian Office Action; Application No. 2,806,906; Jan. 12, 2016; 7 pages.
Canadian Office Action; Application No. 2,806,906; Jan. 6, 2017; 8 pages.
Canadian Office Action; Application No. 2,806,906; Feb. 9, 2018; 11 pages.

* cited by examiner

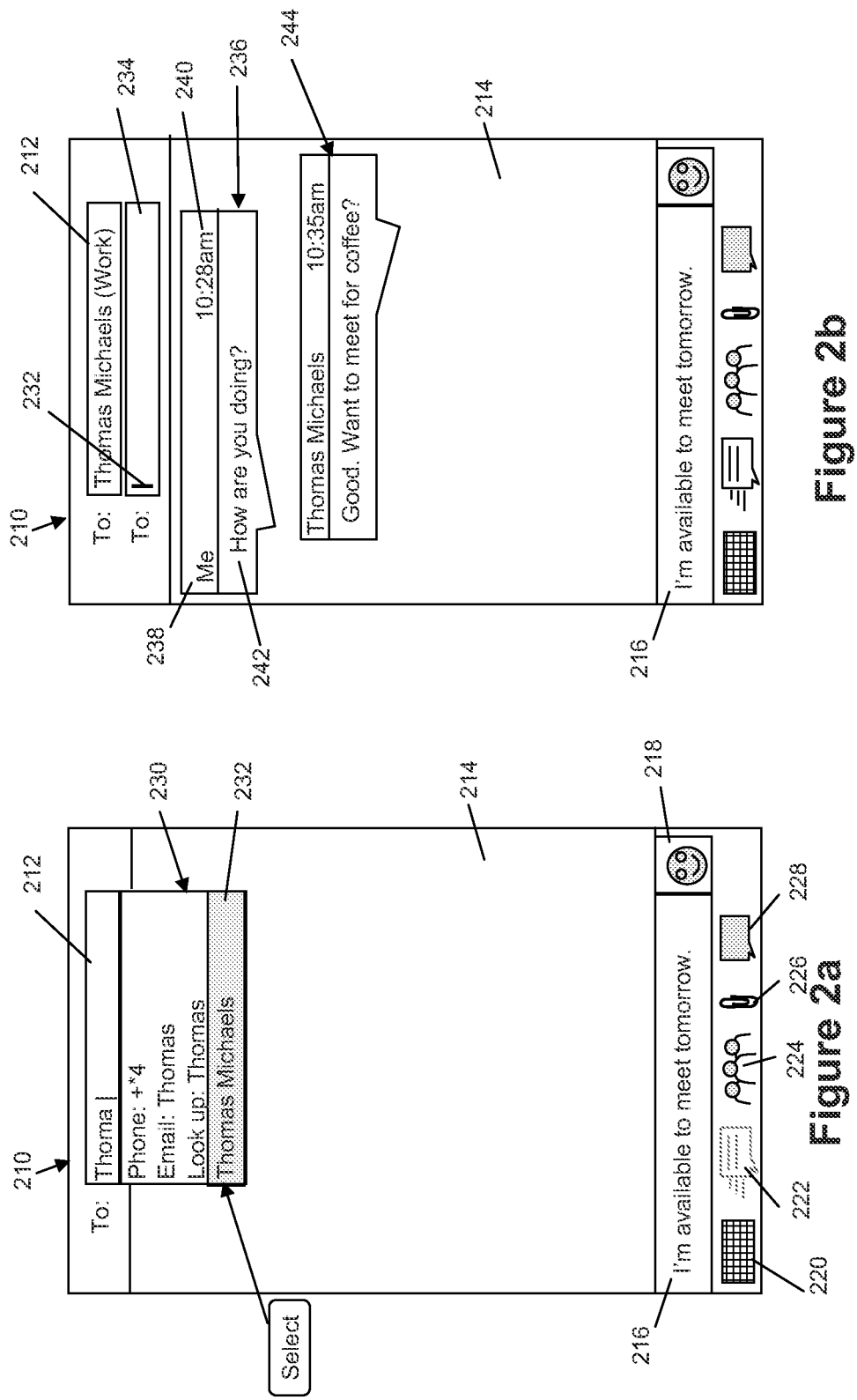

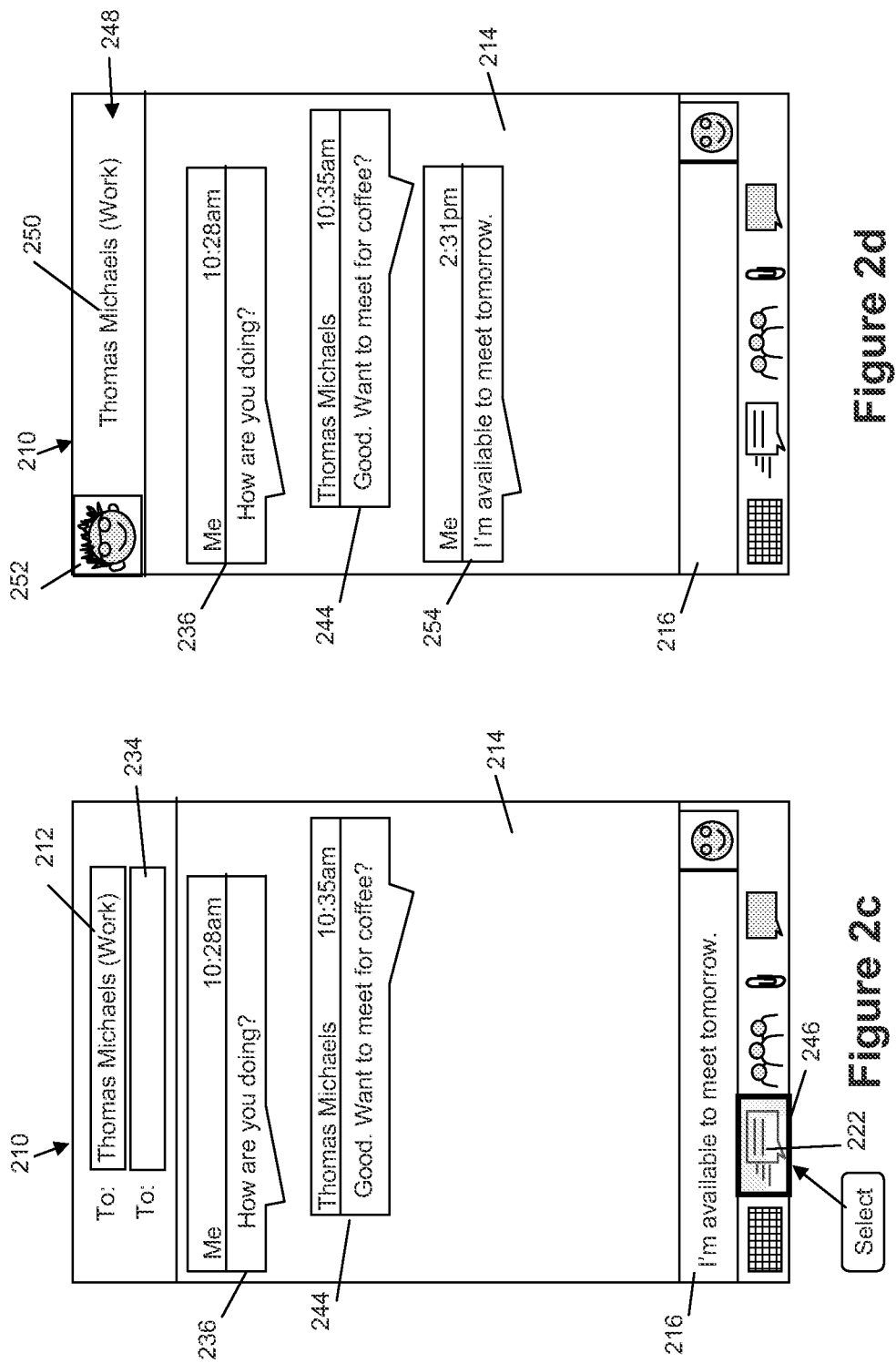

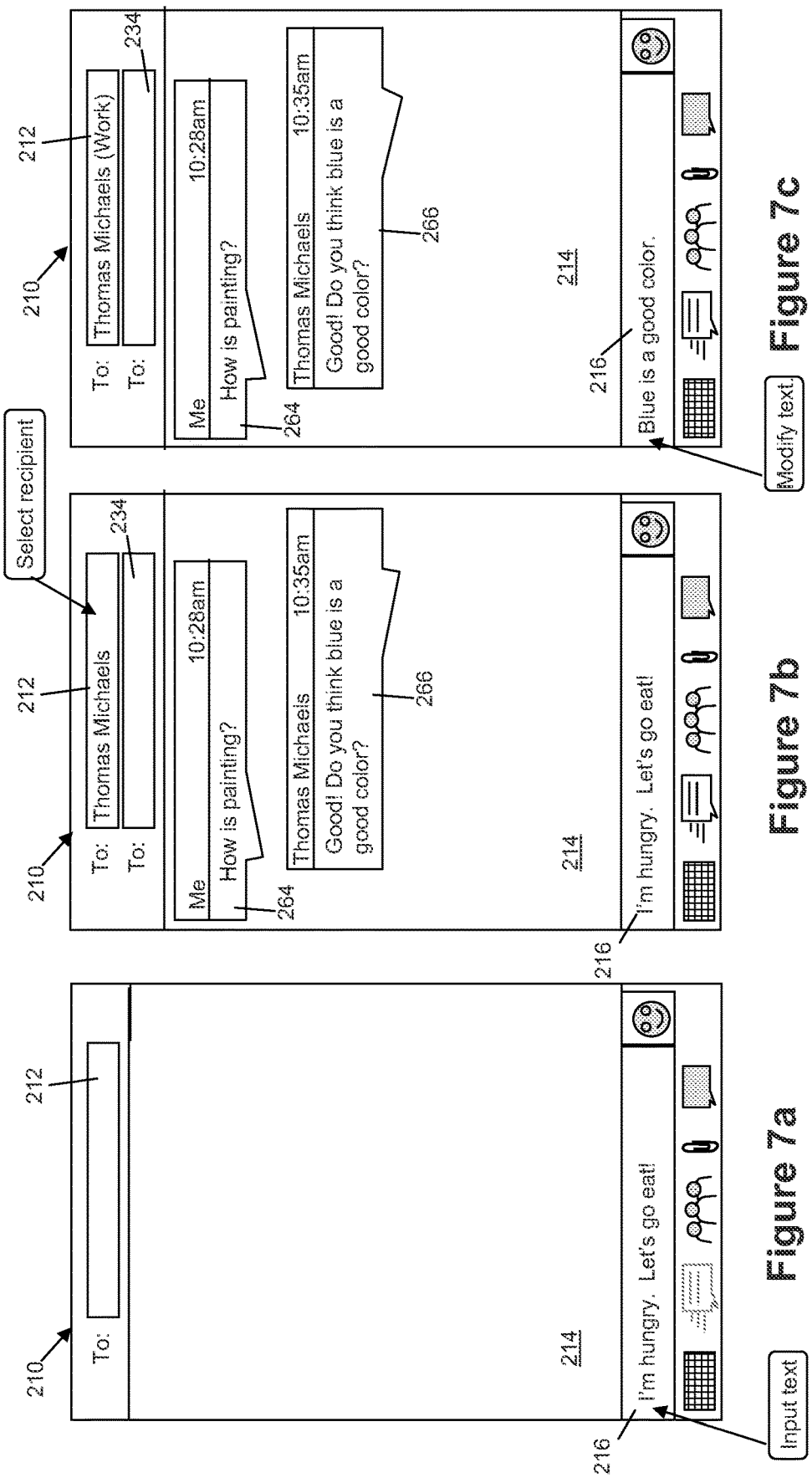

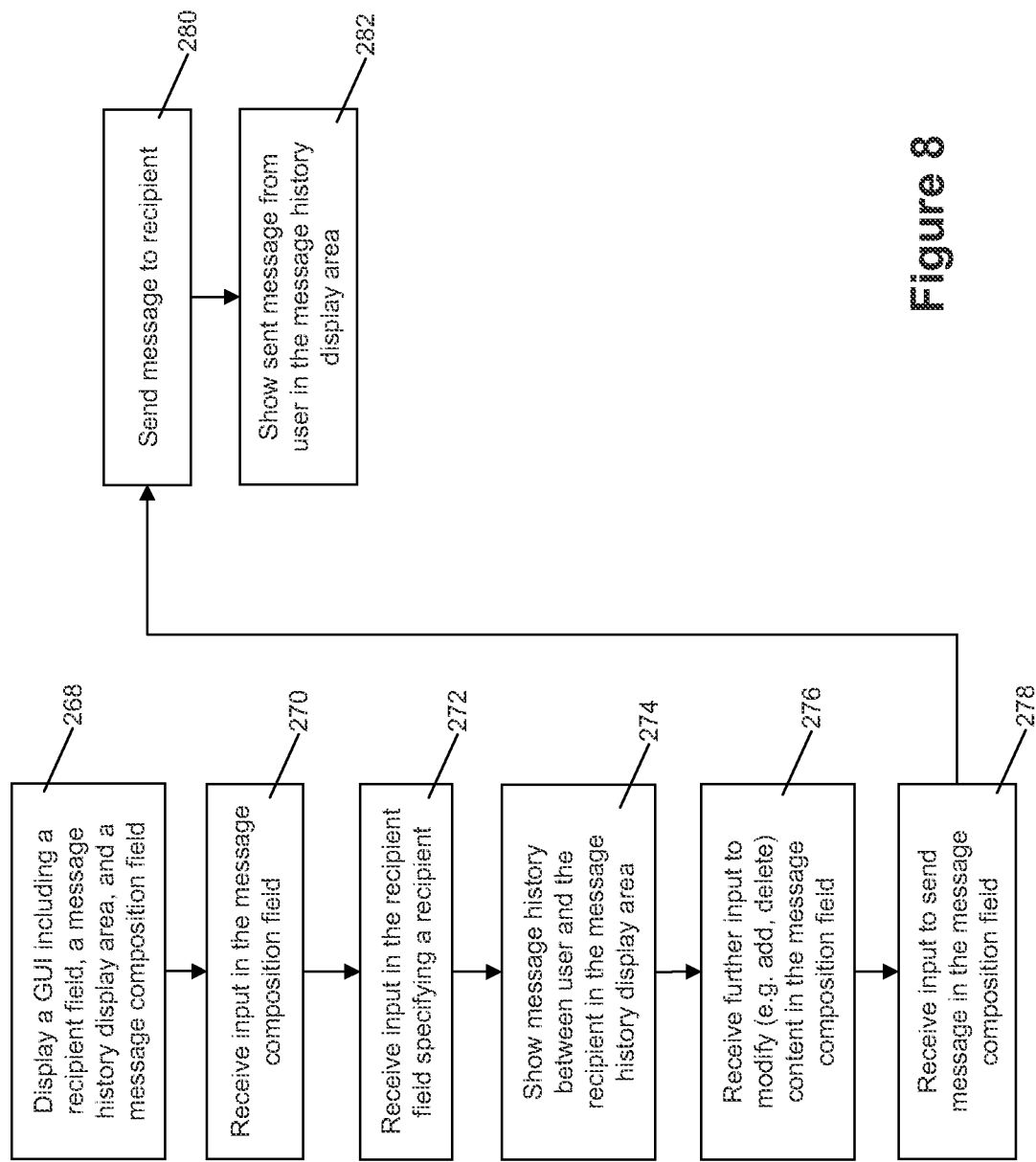

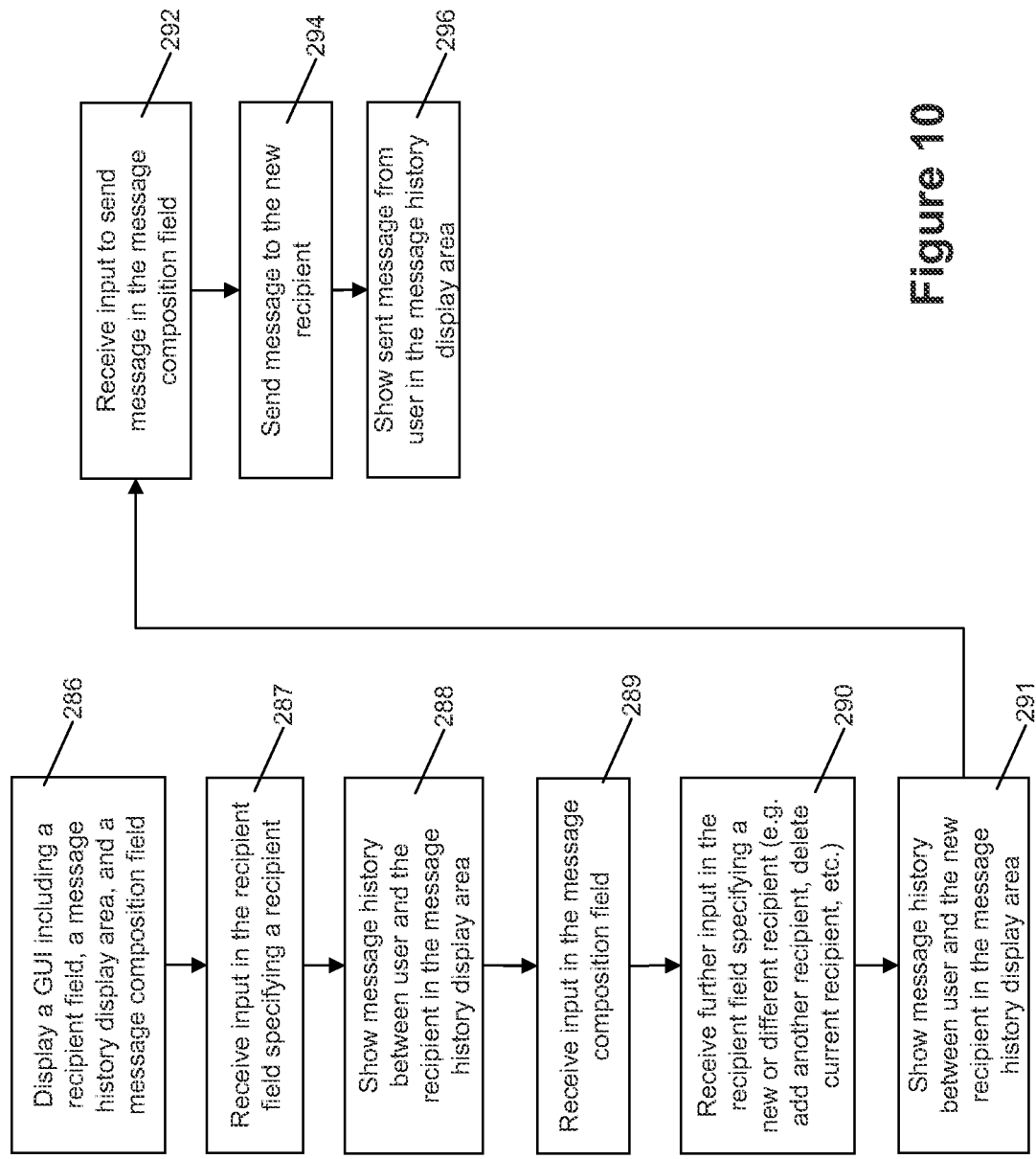

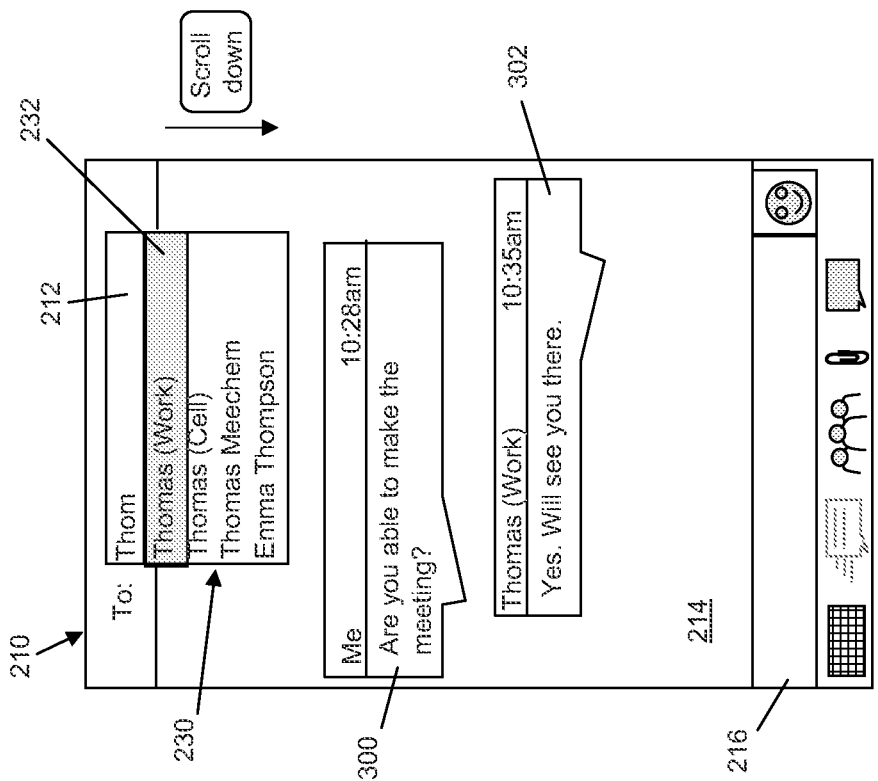
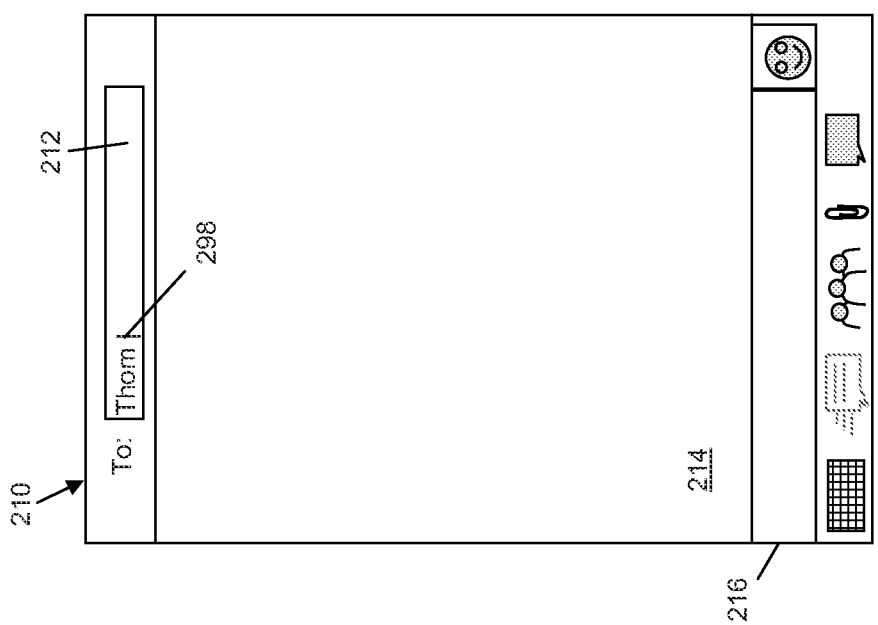
Figure 11b
Figure 11a

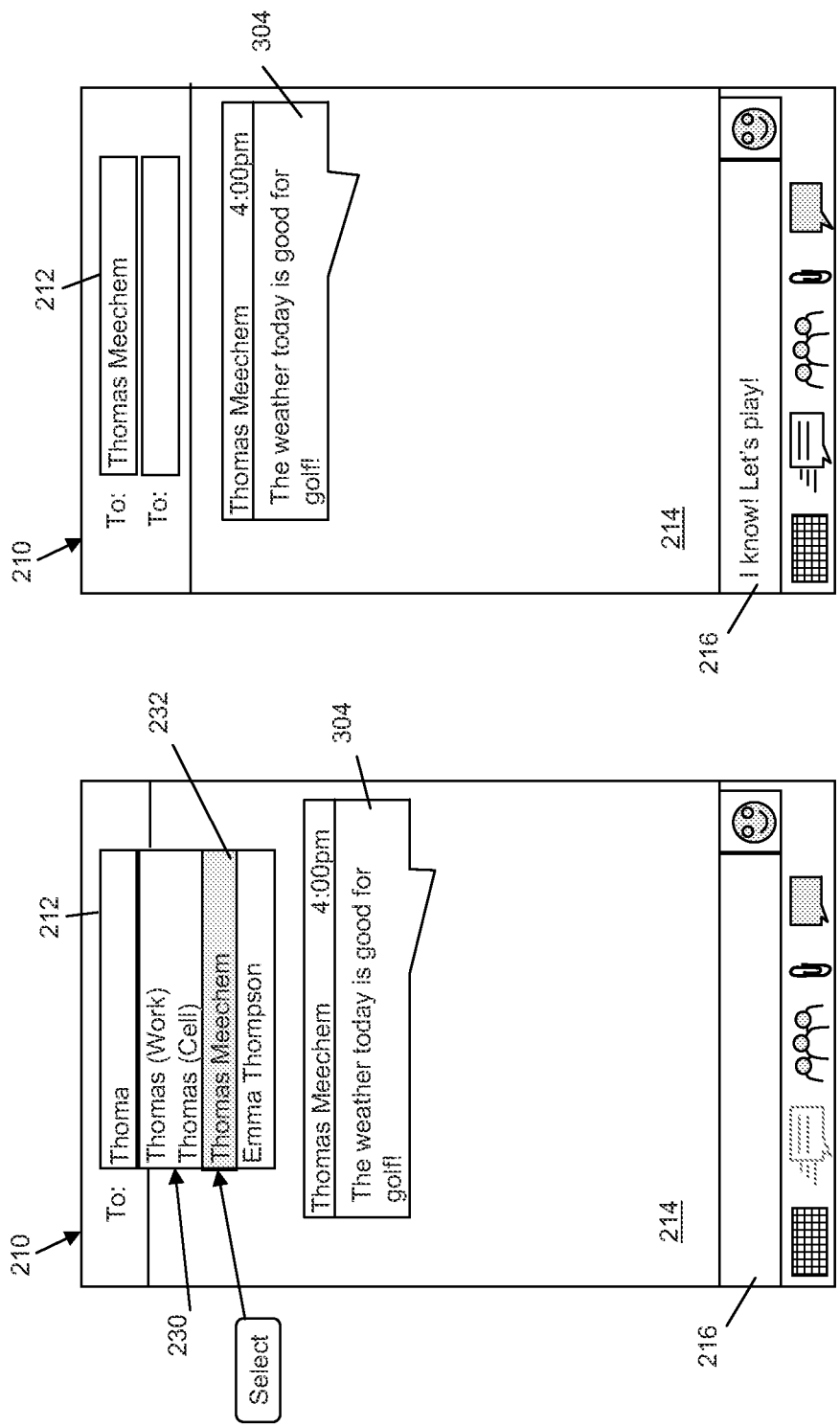

SYSTEM AND METHOD FOR DISPLAYING MESSAGE HISTORY WHEN COMPOSING A MESSAGE

CROSS-REFERENCE TO RELATED APPLICATIONS

This application is a continuation of U.S. patent application Ser. No. 13/295,404 filed Nov. 14, 2011 by Leonid Vymenets, et al. entitled, "System and Method for Displaying Message History when Composing a Message", which is incorporated by reference herein as if reproduced in its entirety.

TECHNICAL FIELD

The following relates to systems and methods for displaying message history when composing a message.

BACKGROUND

Messaging has become a popular way of electronically communicating in a conversational style, in particular using a mobile or handheld device. A user can send messages to a recipient and receive messages from the recipient and can also send and receive messages among a group of recipients, or participants. Messages may be composed and read in a graphical user interface (GUI), which allows a user to specify the recipient or recipients. Non-limiting examples of messaging technology include text messaging and instant messaging (IM). Text messaging includes, for example, short messaging service (SMS) messaging and multimedia messaging service (MMS) messaging.

Messaging conversations often have a history of messages exchanged between the conversation participants, and several conversations may exist with the same recipient. For example, a user may begin a new conversation with a recipient rather than continue a previous conversation. Furthermore, if a recipient is a member of multiple groups, the recipient may be involved in multiple ongoing conversations at the same time. Organizing such conversations can therefore become challenging.

BRIEF DESCRIPTION OF THE DRAWINGS

Embodiments will now be described by way of example only with reference to the appended drawings wherein:

FIGS. 2*a*, 2*b*, 2*c* and 2*d* are example GUIs for composing a message, such that the GUI shows a message history upon detecting that a cursor has been moved away from a recipient field;

FIGS. 7*a*, 7*b*, and 7*c* are example GUIs for composing a message, such that the GUI shows that a message can be composed, a recipient can be specified, and the composed message can be modified;

FIG. 8 is a flow diagram illustrating example computer executable instructions for composing a message, specifying a recipient, and then modifying the composed message;

FIG. 10 is a flow diagram illustrating example computer executable instructions for specifying a recipient, composing a message, and modifying the specified recipient;

FIGS. 11*a*, 11*b*, 11*c*, and 11*d* are example GUIs for composing a message, such that the GUI shows that, as a cursor moves over a recipient, a message history for the recipient can be dynamically displayed;

DETAILED DESCRIPTION OF THE DRAWINGS

In messaging applications, such as text messaging and instant messaging, a user typically composes a message and sends the message to a recipient. The messages that are exchanged between a user and a recipient are also typically recorded or saved. These messages may hereinafter be commonly referred to as a "message history".

Figure 1:
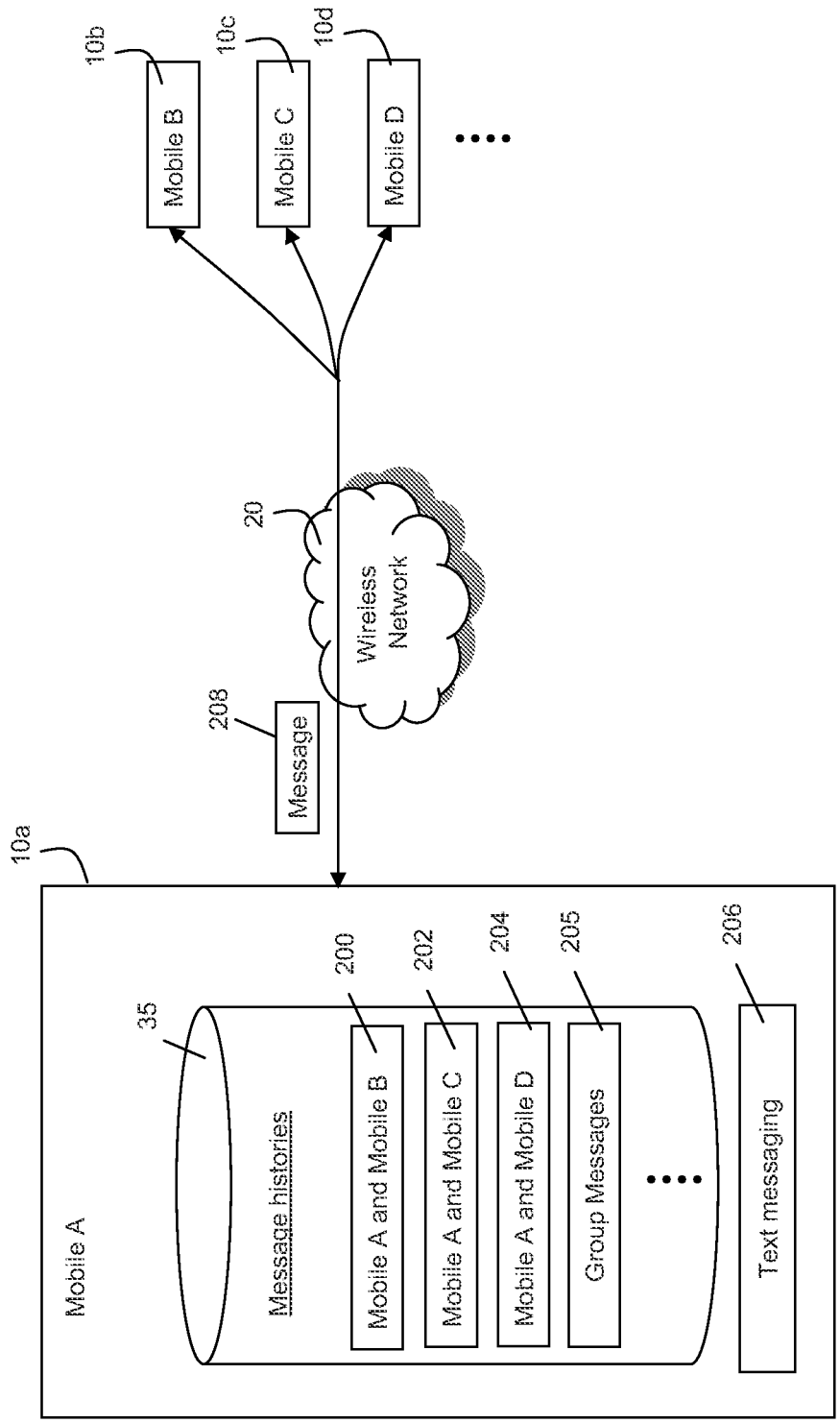
FIG. 1 is a schematic diagram illustrating an example system in which a mobile device is able to exchange messages over a wireless network with other mobile devices.

Turning to FIG. 1, mobile device 10*a* is in communication with other mobile devices 10*b*, 10*c* and 10*d* through a wireless network 20. Mobile device 10*a*, 10*b*, 10*c* and 10*d* are able to send and receive messages with each other, such as message 208. In one example, mobile device 10*a* can use a text messaging application 206 to exchange messages with the other mobile devices 10*b*, 10*c* and 10*d*. Other messaging applications are also applicable to the principles described herein. Messages are input, read, sent and received using a messaging application, as is well known.

It can be appreciated that the mobile device is herein generally referenced with the numeral "10" and that the suffixes "a", "b", "c", and "d" are used only to distinguish between different mobile devices 10 in the examples described.

Mobile device 10a has access to, or has stored thereon, or both, a message history 35. Message history 35 includes messages that have already been exchanged in a message composition application such as SMS, IM, MMS, etc. In one example, message history 35 stores message histories organized according to the sender(s) and receiver(s) involved in the associated messaging conversation. For example, messages exchanged solely between mobile device 10a and mobile device 10b are saved together in storage 200. Similarly, messages exchanged solely between mobile device 10a and mobile device 10c, and messages exchanged solely between mobile device 10a and mobile device 10d, are saved respectively in storages 202 and 204. Messages exchanged among a group of participants that comprises mobile device 10a and any plurality of other mobile devices 10, e.g., mobile device 10b, mobile device 10c, and mobile device 10d, are stored in group storage 205.

A user of mobile device 10a interacts with components of mobile device 10a to participate in a messaging conversation. For example, the user provides input to mobile device 10a using input mechanisms, such as a keyboard and a touch-sensitive screen, in order to compose a new message or to read a received message. Mobile device 10a presents information to the user using output devices, such as a display and a speaker. Using input mechanisms and output mechanisms of mobile device 10a, the user performs messaging functionality as described below, as is well known in the art.

It is recognized that displaying message history at certain times, such as when composing or drafting a message which has not yet been sent, provides beneficial information to the user. For example, when composing a message to a recipient, it is beneficial to know what messages have been previously exchanged between the user and the recipient. This, for example, provides the user with the context of the conversation and allows the user to prepare a message that is appropriate within the context.

It is also recognized that selecting the correct recipient may be difficult based on limited information. For example, although a recipient can be identified by name, or a picture, or both, a user may still not fully recognize the recipient. It is also recognized that the message history between the user and the recipient can help confirm and clarify the identity of the recipient. The user can also use the message history to help identify the subjective relationship (e.g. friendly, curt, informal, formal, etc.) between the user and the recipient.

As the present systems and methods described herein show the message history, for example, upon specifying a recipient, the user can determine whether or not the specified recipient is correct. If the specified recipient is not correct, as determined from the message history, the user can specify another recipient.

Turning to FIGS. 2a, 2b, 2c and 2d, example GUIs are provided showing different stages to invoke the display of message history.

Referring to FIG. 2a, GUI 210 for composing a message is shown. In one example, GUI 210 is displayed on a display of mobile device 10a. GUI 210 includes recipient field 212, message history display area 214, and message composition field 216. Recipient field 212 enables a user to select and specify one or more recipients. For example, a user can enter the name of a contact in recipient field 212 using a keyboard of mobile device 10a. Message history display area 214 displays message history information, such as, for example, a message history from message histories 35 of FIG. 1. Message composition field 216 enables a user to input text to compose or draft a message. For example, message composition field 216 in FIG. 2a includes the message: "I'm available to meet tomorrow." In the example of FIG. 2a, the message has not yet been sent and is sent when send button 222 is selected or actuated by the user.

GUI 210 also enables user to add icons to a message, such as emoticons, by selecting emoticon button 218. GUI 210 also includes keyboard button 220, recipients button 224, attachments button 226, and next unopened item button 228. Upon detecting an actuation of keyboard button 220, a touch screen keyboard is shown on a display of mobile device 10a display. Upon detecting an actuation of recipients button 224, the selected recipients are shown. Further information about the recipients can also be shown. Upon detecting an actuation of attachments button 226, functionality is presentation that enables a user to add or attach a file to the message. Upon detecting an actuation of next unopened item button 228, the next unopened message is displayed.

Continuing with FIG. 2a, in recipient field 212, text has been input by a user which causes drop down list 230 to be displayed. Drop down list 230 includes various entries, including a recipient name corresponding to the text that has been input into recipient field 212. For example, the input text recites "Thoma", and a possible match of a recipient name is "Thomas Michaels", since it includes the same letters of "Thoma". Cursor 232, illustrated as a highlighted box, is positioned over the recipient name "Thomas Michaels".

Upon detecting a selection of cursor 32, indicating the selection by a user of recipient name "Thomas Michaels", GUI 210 of FIG. 2b is displayed. As shown in FIG. 2b, subsequent to user selection of the name "Thomas Michaels" the name "Thomas Michaels (Work)" is displayed in recipient field 212. As shown in FIG. 2b, the recipient name includes the "(Work)" identification to show that a message will be sent to Thomas Michaels' work phone number. Upon the selection of "Thomas Michaels" and the display of "Thomas Michaels (Work)" in recipient field 212, a second (or additional) recipient field 234 is displayed and navigation focus moves, e.g., cursor 232 is moved to the second recipient field 234 as shown in FIG. 2b. Furthermore, upon the selection of "Thomas Michaels" and the display of "Thomas Michaels (Work)" in recipient field 212, a message history associated with Thomas Michaels is retrieved or otherwise read from messages histories 35 (of FIG. 1) and is displayed in message history display area 214. The retrieved message history includes message 236 from the user, identified as "Me", and message 244 from Thomas Michaels. In one example, message 236 is displayed as time 240 that indicates the time at which message 236 was sent, identifier 238 of who sent the message, as well as content (or text) 242 of message 236.

As shown in GUI 210 of FIG. 2b, the user may still add or select further recipients through further interaction with second recipient field 234. The message history associated with the currently specified recipient (i.e., the recipient specified in recipient field 212) is also displayed. While cursor 232 is located in recipient field 212 or in second recipient field 234, the associated message history continues to be displayed allowing the user to determine, for example, if the specified recipient in recipient field 212 is correct, based on the message history. If the recipient is not correct, the user can move cursor 232 back to recipient field 212 to modify the specified recipient. For example, a single navigational input may be used to move cursor 232 from second recipient field 234 to recipient field 212.

The user can use the message history to confirm that he or she has selected the correct or desired recipient for messaging. In the example shown in FIG. 2b, Thomas Michaels is the correct recipient and the user has proceeded to input a draft a message comprising the text "I'm available to meet tomorrow".

In one example, when actuations are detected to move cursor 232 from the second recipient field 234 to message composition field 216, recipient field 212 and recipient field 234 continue to be displayed. In such an example, the user is able to change recipients while drafting a message through navigation between message composition field 216 and recipient field 212 or second recipient field 234.

Referring to FIG. 2c, cursor 246 is positioned over send button 222. Upon detecting a selection of send button 222, the message input in message composition field 216 is sent to the specified recipient or recipients.

GUI 210 of FIG. 2d displays an updated message history display area 254 that includes sent message 254.

Figure 3:
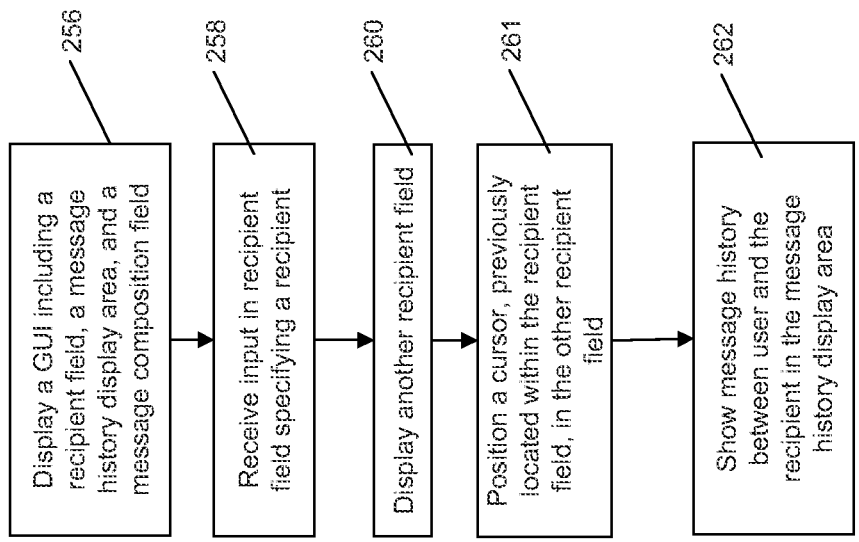
FIG. 3 is a flow diagram illustrating example computer executable instructions for showing the message history upon detecting that a cursor has been moved away from a recipient field.

Turning to FIG. 3, example computer executable instructions are provided for showing message history in GUI 210 (of FIGS. 2a, 2b, 2c and 2d, for example) while composing a message. At block 256, GUI 201 is displayed and includes a recipient field, a message history display area, a cursor and a message composition field. At block 258 an input is received in the recipient field specifying a recipient. At block 260, upon detecting that the recipient has been specified, t a second recipient field is displayed. At block 261, the cursor, which was previously located within the recipient field, is repositioned or moved to the second recipient field. At block 262 the message history associated with the recipient is retrieved from a message history store and displayed in the message history display area.

Figure 4:
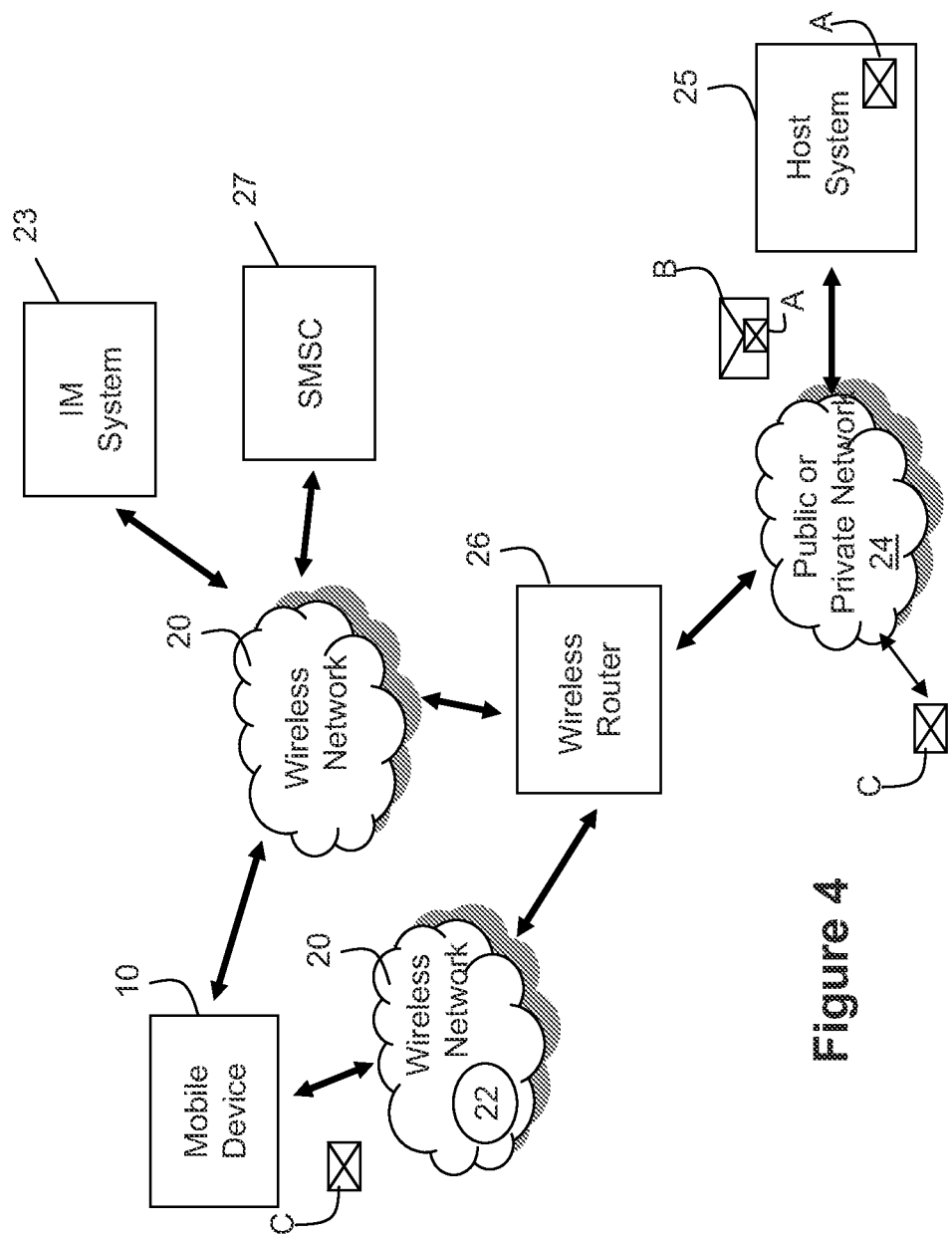
FIG. 4 is a schematic diagram illustrating an example system in which data items are pushed from a host system to a mobile device.

As shown in FIG. 4, in one example, mobile device 10 is a two-way communication device with advanced data communication capabilities including the capability to communicate with other mobile devices 10 or computer systems through a network of transceiver stations. Mobile device 10 may also have the capability to allow voice communication. Depending on the functionality provided by mobile device 10, it may be referred to as a data messaging device, a two-way pager, a cellular telephone with data messaging capabilities, a wireless Internet appliance, a tablet, a laptop, a net book, or a data communication device (with or without telephony capabilities). Mobile device 10 can also be one that is used in a system that is configured for continuously routing all forms of pushed information from host system 25 to mobile device 10. Mobile device 10 can also be used for SMS messaging via an SMS messaging centre (SMSC) 25. Mobile device 10 can also be used for instant messaging (IMing) via an IM system 23.

FIG. 4 is an example system diagram showing the redirection of user data items (such as message A or C) from a corporate enterprise computer system host system 25 to mobile device 10 via wireless router 26. Wireless router 26 provides wireless connectivity functionality that abstracts complexities of wireless network 20, and implements features necessary to support pushing data to mobile device 10. Although not shown, a plurality of mobile devices may access data from host system 25. In this example, message A represents an internal message sent from, e.g. a desktop computer (not shown) within host system 25, to any number of server computers in the corporate network (e.g. LAN), which may, in general, include a database server, a calendar server, an E-mail server or a voice-mail server. It can be appreciated that SMS messaging and/or IMing can also be provided via the wireless router 26.

Message C 4 represents an external message from a sender that is not directly connected to host system 25, such as mobile device 10, some other mobile device (not shown), or any device connected to the public or private network 24 (e.g. the Internet). Message C may be e-mail, voice-mail, calendar information, database updates, web-page updates or a command message from mobile device 10 to host system 25. Host system 25 may comprise, communication links, hardware and software associated with a corporate enterprise computer network system, one or more wireless mobility agents, a TCP/IP connection, a collection of data stores, (for example a data store for e-mail could be an off-the-shelf mail server like Microsoft Exchange® Server or Lotus Notes® Server), and in some examples, is contained within and behind a corporate firewall.

As an illustrative example of the operation for wireless router 26 shown in FIG. 4, consider a data item A, repackaged in outer envelope B (the packaged data item A now referred to as "data item (A)") and sent to mobile device 10. Although the above describes host system 25 as being used within a corporate enterprise network environment, this is just one example of one type of host service that offers push-based messages for a handheld wireless device that is capable of notifying and presenting the data to the user in real-time at the mobile device when data arrives at the host system 25.

Wireless router 26 provides a range of services to make creating a push-based host service possible. These networks may comprise: (1) the Code Division Multiple Access (CDMA) network, (2) the Groupe Special Mobile or the Global System for Mobile Communications (GSM) and the General Packet Radio Service (GPRS), and (3) the existing and upcoming third-generation (3G) and fourth generation (4G) networks like EDGE, UMTS and HSDPA, LTE, WI-MAX® etc. Some older examples of data-centric networks include, but are not limited to: (1) the Mobitex Radio Network ("MOBITEX®") and (2) the DataTAC Radio Network ("DATATAC®").

To be effective in providing push services for host systems 25, wireless router 26 may implement a set of defined functions. It can be appreciated that one could select many different hardware configurations for wireless router 26, however, many of the same or similar set of features would likely be present in the different configurations.

Figure 5:
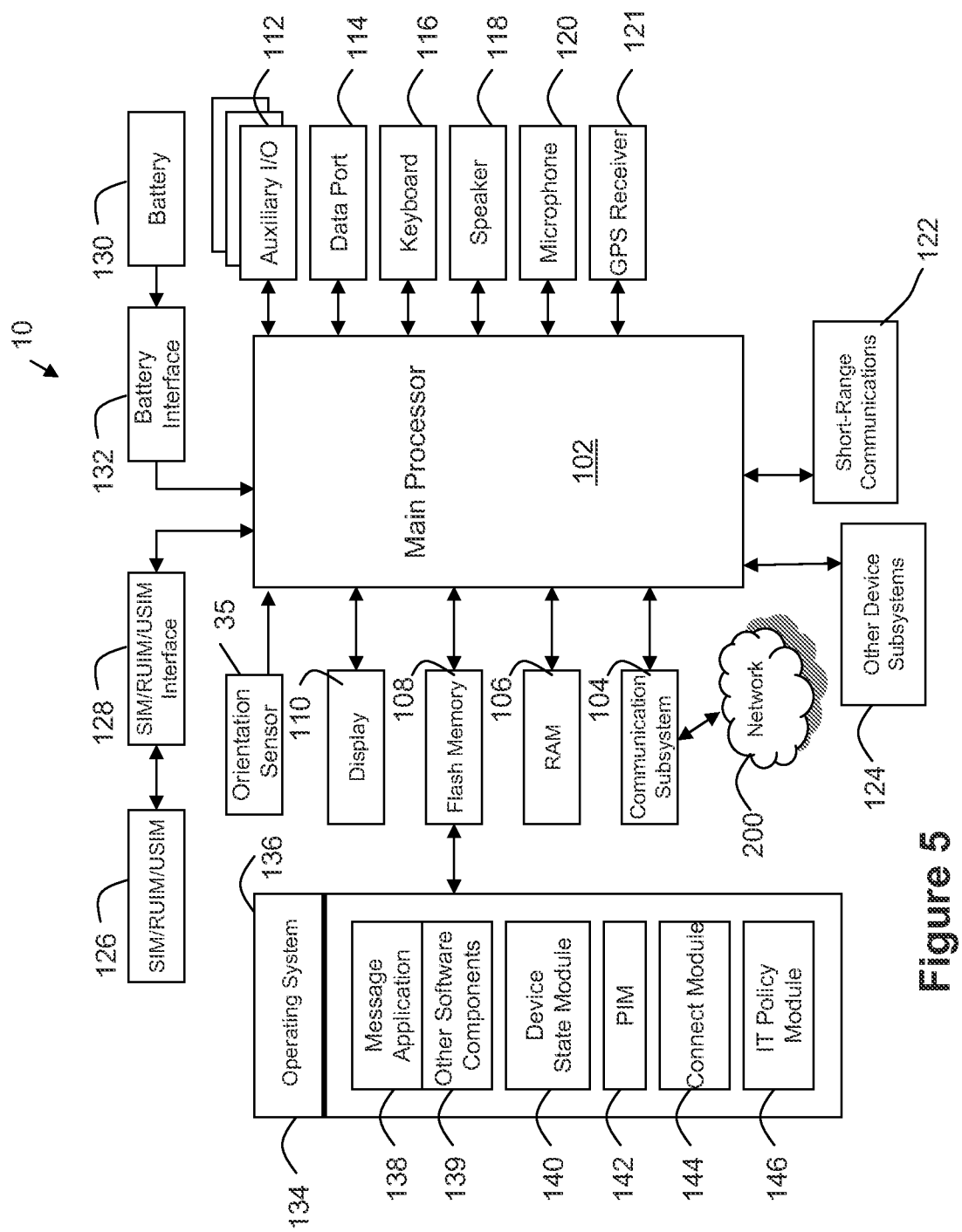
FIG. 5 is a block diagram of an example mobile device.
Figure 6:
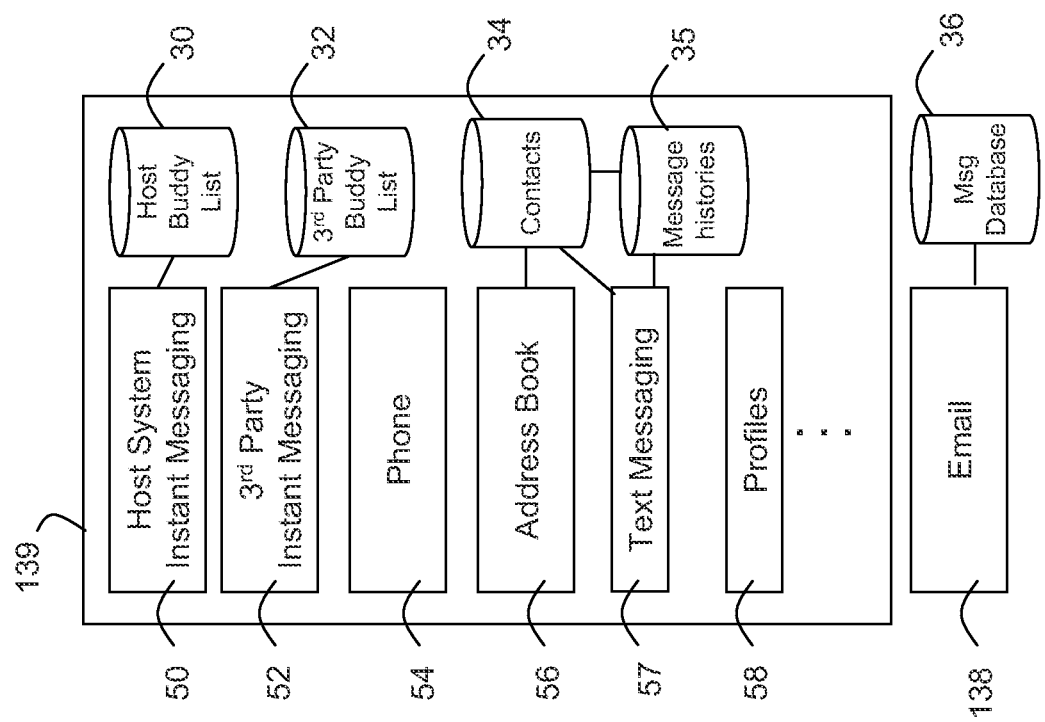
FIG. 6 is a block diagram illustrating example ones of the other software applications and components shown in FIG. 5.

An example configuration of mobile device 10 is illustrated in FIGS. 5-6. Referring first to FIG. 5, shown therein is a block diagram of an example of a mobile device 10. Mobile device 10 comprises main processor 102 that controls the overall operation of mobile device 10. Communication functions, including data and voice communications, are performed through a communication subsystem 104. Communication subsystem 104 receives messages from and sends messages to network 200. In this example of mobile device 10, communication subsystem 104 is configured in accordance with, for example GSM®, CDMA, UMTS, LTE, GPRS, WI-FI® standards, which are used worldwide. Other communication configurations that are equally applicable are 3G and 4G networks, and the like. New standards are still being defined, but it is believed that they will have similarities to the network behaviour described herein, and it will also be understood by persons skilled in the art that the embodiments described herein are intended to use any other suitable standards that are developed in the future. The wireless link connecting communication subsystem 104 with network 200 represents one or more different Radio Frequency (RF) channels, operating according to defined protocols.

Main processor 102 also interacts with additional subsystems such as a Random Access Memory (RAM) 106, a flash memory 108, a display 110, an auxiliary input/output (I/O) subsystem 112, a data port 114, a keyboard 116, a speaker 118, a microphone 120, a GPS receiver 121, short-range communications subsystem 122, and other device subsystems 124. As will be discussed below, short-range communications subsystem 122 can implement any suitable or desirable device-to-device or peer-to-peer communications protocol capable of communicating at a relatively short range, e.g. directly from one device to another. Examples include Bluetooth®, ad-hoc WI-FI®, infrared, or any "long-range" protocol re-configured to utilize available short-range components. It will therefore be appreciated short-range communications subsystem 122 may represent any hardware, software or combination of both that enable a communication protocol to be implemented between devices or entities in a short range scenario, such protocol being standard or proprietary.

Some of the subsystems of mobile device 10 perform communication-related functions, whereas other subsystems may provide "resident" or on-device functions. By way of example, display 110 and keyboard 116 may be used for both communication-related functions, such as entering a text message for transmission over network 200, and device-resident functions such as a calculator or task list.

Mobile device 10 can send and receive communication signals over network 200 after required network registration or activation procedures have been completed. Network access is associated with a subscriber or user of mobile device 10. To identify a subscriber, mobile device 10 may use a subscriber module component or "smart card" 126, such as a Subscriber Identity Module (SIM), a Removable User Identity Module (RUIM) and a Universal Subscriber Identity Module (USIM). In the example shown, a SIM/RUIM/USIM 126 is to be inserted into a SIM/RUIM/USIM interface 128 in order to communicate with a network. Without the component 126, mobile device 10 is not fully operational for communication with the network 200. Once SIM/RUIM/USIM 126 is inserted into SIM/RUIM/USIM interface 128, it is coupled to the main processor 102.

Mobile device 10 is typically a battery-powered device and in this example includes a battery interface 132 for receiving one or more rechargeable batteries 130. In at least some embodiments, battery 130 can be a smart battery with an embedded microprocessor. Battery interface 132 is coupled to a regulator (not shown), which assists battery 130 in providing power V+ to mobile device 10. Although current technology makes use of a battery, future technologies such as micro fuel cells may provide the power to mobile device 10.

Mobile device 10 also includes an operating system 134 and software components 136 to 146 which are described in more detail below. Operating system 134 and software components 136 to 146 that are executed by main processor 102 are typically stored in a persistent store such as flash memory 108, which may alternatively be a read-only memory (ROM) or similar storage element (not shown). Those skilled in the art will appreciate that portions of operating system 134 and software components 136 to 146, such as specific device applications, or parts thereof, may be temporarily loaded into a volatile store such as the RAM 106. Other software components can also be included, as is well known to those skilled in the art.

The subset of software applications 136 that control basic device operations, including data and voice communication applications, may be installed on mobile device 10 during its manufacture. Software applications may include a message application 138, a device state module 140, a Personal Information Manager (PIM) 142, a connect module 144 and an IT policy module 146. A message application 138 can be any suitable software program that allows a user of mobile device 10 to send and receive electronic messages, wherein messages are typically stored in flash memory 108 of mobile device 10. A device state module 140 provides persistence, i.e. device state module 140 ensures that important device data is stored in persistent memory, such as flash memory 108, so that the data is not lost when mobile device 10 is turned off or loses power. A PIM 142 includes functionality for organizing and managing data items of interest to the user, such as, but not limited to, e-mail, text messages, instant messages, contacts, calendar events, and voice mails, and may interact with network 200. A connect module 144 implements the communication protocols that are required for mobile device 10 to communicate with the wireless infrastructure and any host system 25, such as an enterprise system, that mobile device 10 is authorized to interface with. An IT policy module 146 receives IT policy data that encodes the IT policy, and may be responsible for organizing and securing rules such as the "Set Maximum Password Attempts" IT policy.

Other types of software applications or components 139 can also be installed on mobile device 10. These software applications 139 can be pre-installed applications (i.e. other than message application 138) or third party applications, which are added after the manufacture of mobile device 10. Examples of third party applications include games, calculators, utilities, etc. Additional applications 139 can be loaded onto mobile device 10 through at least one of wireless network 20, auxiliary I/O subsystem 112, data port 114, short-range communications subsystem 122, or any other suitable device subsystem 124.

Data port 114 can be any suitable port that enables data communication between mobile device 10 and another computing device. Data port 114 can be a serial or a parallel port. In some instances, data port 114 can be a USB port that includes data lines for data transfer and a supply line that can provide a charging current to charge battery 130 of mobile device 10.

For voice communications, received signals are output to speaker 118, and signals for transmission are generated by microphone 120. Although voice or audio signal output is accomplished primarily through speaker 118, display 110 can also be used to provide additional information such as the identity of a calling party, duration of a voice call, or other voice call related information.

For composing data items, such as e-mail messages and text messages, for example, a user or subscriber could use a touch-sensitive overlay (not shown) on display 110 that is part of a touch screen display (not shown), in addition to possibly auxiliary I/O subsystem 112. Auxiliary I/O subsystem 112 may include devices such as: a mouse, track ball, infrared fingerprint detector, or a roller wheel with dynamic button pressing capability. A composed item may be transmitted over wireless network 20 through communication subsystem 104.

FIG. 6 shows an example of the other software applications and components 139 of FIG. 5 that may be stored on and used with mobile device 10. Only examples are shown in FIG. 6 and such examples are not to be considered exhaustive. In this example, a host instant message application 50, 3$^{rd}$ party instant messaging application 52, phone application 54, address book 56 and a profiles application 58 are shown to illustrate the various features that may be provided by mobile device 10. Also shown in FIG. 6 is message application 138, which in the following will be referred to as an email application 138 for clarity and stores or otherwise has access to a message database 36 for storing incoming and outgoing messages as well as those stored in various folders. It will be appreciated that the various applications may operate independently or may utilize features of other applications. For example, phone application 54 and email application 138 may use address book 56 for contact details obtained from a list of contacts 34.

Another example of a messaging application is a text messaging application 57 which is used for sending messages over phone or cellular networks. These messages include, for example, SMS and MMS messages. The message histories from the text messages are storied in database 35. Like other messaging applications, text messaging application 57 and message histories 35 can interact with other applications, such as contacts database 34 of address book 56.

The host system instant messaging application 50 is an instant messaging service that is hosted and provided by host system 25. The host system instant messaging application 50 includes or otherwise has access to a host buddy list 30 for storing contact information for buddies also using host system instant messaging application 50. 3$^{rd}$ part instant messaging application 52 includes or otherwise has access to a 3$^{rd}$ party buddy list 32 for storing contact information for buddies also using 3$^{rd}$ party instant messaging application 52. It will be appreciated that any number of host system or 3$^{rd}$ party instant messaging services can be installed and run on mobile device 10 and thus the two shown in FIG. 6 are for illustrative purposes only. Also, it will be appreciated that in other embodiments, only a single instant messaging service may be supported or a unified instant messaging service that combines contact or buddy lists for multiple instant messaging services and utilizes a common user interface (not shown).

In some example embodiments, each message generally comprises a body, which contains the content for the message (e.g. text), and a header, which contains various fields used for transmitting and processing each message. For example, the header includes a message type field to specify the type of transmission (e.g. PIN, SMS, MMS, email, etc.), a source field to specify the device address for the sender, a destination field to specify the device address for the intended recipient, a conversation ID field to identify which conversation thread the message corresponds to (e.g. such that each message is identified by the conversation in which it was sent), and a timestamp field to indicate the time (and if desired, the date) at which the message was sent by the designated sender.

It will be appreciated that any module or component exemplified herein that executes instructions or operations may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data, except transitory propagating signals per se. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of mobile device 10, or accessible or connectable thereto. Any application or module herein described may be implemented using computer readable/executable instructions or operations that may be stored or otherwise held by such computer readable media.

Details regarding examples for displaying message history when composing a message will now be discussed.

Turning to FIGS. 7a, 7b and 7c, example mobile device GUIs show flexible ordering of adding a recipient and composing a message. In one example, a user begins to compose a message, specifies a recipient, and then returns to composing the message. Accordingly, text input in a message composition field may be received before input in a recipient field for specifying the recipient.

Referring first to FIG. 7a, mobile device 10 detects the input of the text "I'm hungry. Let's go eat!" into message composition field 216.

In FIG. 7b, mobile device 10 detects the input of the recipient "Thomas Michaels", into recipient field 212. Subsequently, and upon detecting input to move the cursor from recipient field 212, message history (comprising messages 264 and 266) associated with the recipient is shown in message history display area 214. In the example shown, the draft message in message composition field 216 does not match the context of the message history (e.g., messages 264 and 266). On seeing the message history for the specified recipient, the user is able to change the recipient, for example, if the user inadvertently selected the incorrect recipient for the message. Alternatively, if the user has selected the correct recipient, the user is able to see that the draft message does not fit the context of the conversation and may modify the text accordingly.

Referring to FIG. 7c, the user decides, in this example, that the selected recipient is correct and, thus, modifies the draft text in message composition field 216, in order for the message to better match the context of the conversation. In some examples, while drafting the message in message composition field 216, recipient fields 212 and 234 continue to be displayed to permit viewing and editing, if desired, the recipients.

Turning to FIG. 8, example computer executable instructions are provided, with reference to corresponding elements of FIGS. 7a, 7b and 7c. At block 268, mobile device 10 displays GUI 210 including recipient field 212, message history display area 214, and message composition field 216. At block 270, an input is received for message composition field 216 to add or modify message content. At block 272, an input is received for recipient field 212 specifying a recipient. At block 274, the message history associated with the recipient is retrieved and displayed in message history display area 214. At block 275, mobile device 10 receives further input to modify (e.g. add, delete) content in message composition field 216. At block 278, an input is received to send the text of the message specified in message composition field 216, by, for example, an actuation of a send button. At block 280, the message is sent to the recipient. At block 282, the sent message is displayed in message history display area 214.

Figures 9A, 9B, 9C:
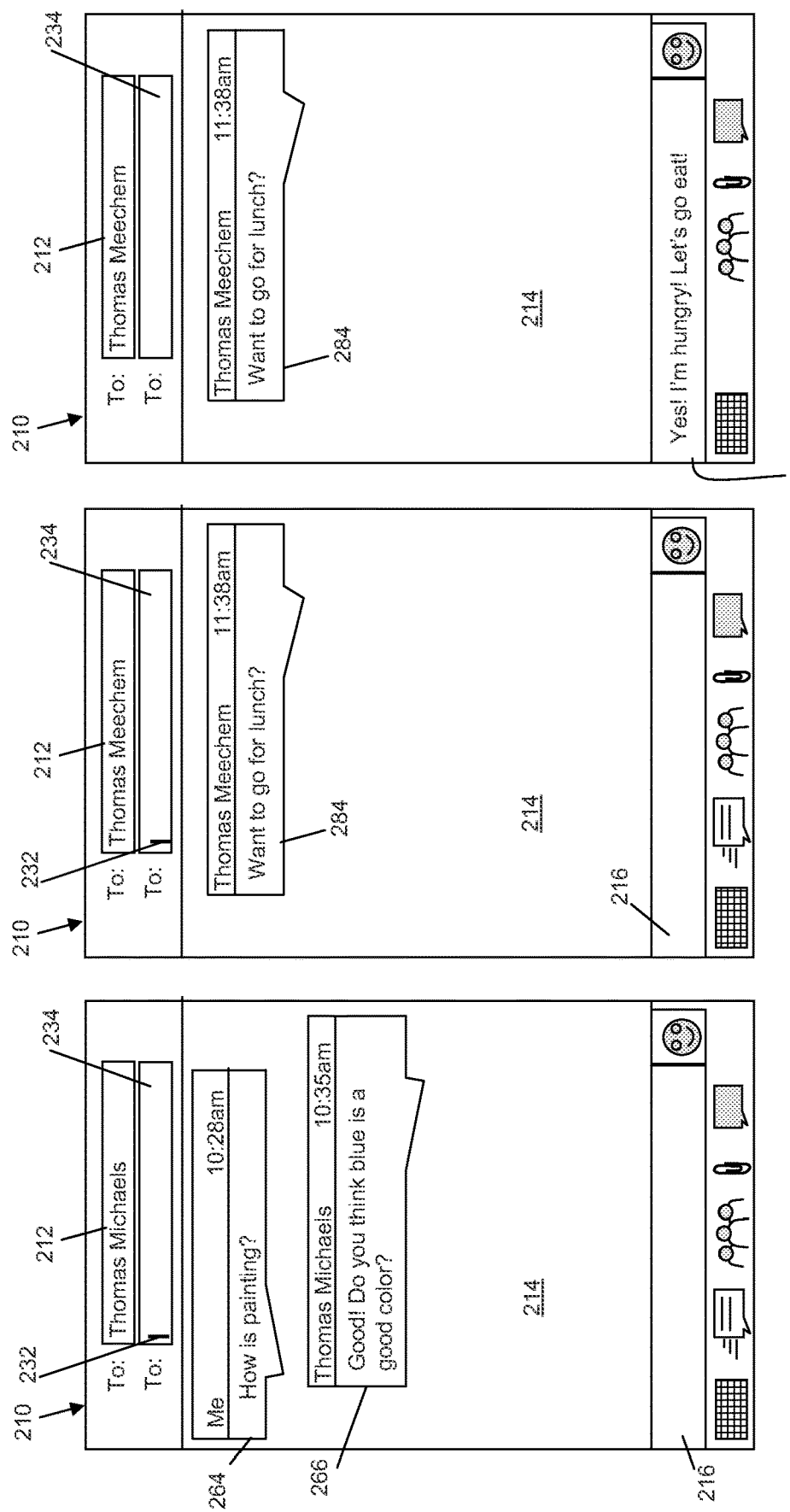
FIGS. 9*a*, 9*b*, and 9*c* are example GUIs for composing a message, such that the GUI shows that a recipient can be specified, a message can be composed, and the specified recipient can be modified.

Further example mobile device GUIs show the flexibility of the order in which information is added in FIGS. 9a, 9b and 9c. In one example, a user specifies a recipient, changes or modifies the recipient, and then composes message content. The GUIs of FIGS. 9a, 9b and 9c allow recipient information and message content to be added in various sequences, and to be modified in any order.

Referring first to FIG. 9a, mobile device 10 detects the input of the recipient "Thomas Michaels" into recipient field 212. Upon detecting the input of the recipient, a message history relating to the input recipient (comprising messages 264 and 266) is retrieved and displayed in message history display area 214. Based on the retrieved and displayed message history for example, the user may realize that "Thomas Michaels" is not the correct recipient and that they intended to select or input another recipient.

Referring to FIG. 9b, mobile device 10 detects input to change the recipient in recipient field 212 to "Thomas Meechem". Upon detecting the input to change the recipient, a new message history (comprising message 284) is retrieved and displayed in message history display area 214. In this example, "Thomas Meechem" is the desired recipient, which the user can confirm based on the message history (comprising message 284).

Once the desired recipient is input, with reference to FIG. 9c, an appropriate message may be composed in message composition field 216.

Turning to FIG. 10, example computer executable instructions are provided, with reference to corresponding elements of FIGS. 9a, 9b and 9c. At block 286, mobile device 10 displays GUI 210 including recipient field 212, message history display area 214, and message composition field 216. At block 287, an input is received into recipient field 212 specifying the recipient of a message being composed. At block 288, the message history of messages communicated between mobile device 10 and the recipient is retrieved from message history storage and displayed in message history display area 214. At block 289, an input is received into message composition field 216. At block 290, a further input is received in the recipient field 212 specifying a new or different recipient. For example, the new recipient can replace the current recipient. In another example, a new recipient is added or deleted to a list of recipients. At block 291, the message history associated with the new recipient, e.g., between the user and the new recipient or recipients, is retrieved and then shown in message history display area 214. At block 292, mobile device 10 receives an input to send the message, which causes the message to be sent at block 294. At block 296 the sent message is shown in a new or updated message history display area 214.

Turning to FIGS. 11a, 11b, 11c and 11d, example GUIs demonstrate the ability to dynamically display message histories. In one example, while scrolling through a list of candidate recipients, without having actually specified a recipient, a message history for the currently highlighted recipient is shown.

Referring first to FIG. 11a, mobile device 10 detects input of the text "Thom" into recipient field 212. Cursor 298 is shown in recipient field 212. Mobile device 10 detects that there are candidate recipients having recipient names containing the letters "Thom", and displays a dropdown list of such recipients, as is well known in the art.

Referring to FIG. 11b, dropdown list 230 includes four candidate recipients, namely Thomas (Work); Thomas (Cell); Thomas Meechem; and Emma Thompson. Cursor 232, illustrated as a highlighted bar, can be used to scroll up or down the list 230 as is well known, using, for example, an input mechanism of mobile device 210. When mobile device 10 detects that cursor 232 is positioned over a recipient of dropdown list 230, such as "Thomas (Work)", then the message history (comprising messages 300 and 302) between the user of mobile device 10 and "Thomas (Work)" is shown in message history display area 214. The message history helps determine if the highlighted recipient is the desired recipient. In one example, if the highlighted recipient is not the desired recipient, the user can provide input to mobile device 10 to scroll through, or otherwise select another recipient of dropdown list 230. Highlighting a recipient is not the same as selected a recipient. For example, to select a recipient, the recipient name is first highlighted, and then, if a selection input is received with respect to the highlighted name, then the highlighted recipient is selected. Furthermore, for example, highlighting a recipient in dropdown list 230 does not cause dropdown list 230 to cease being displayed, dropdown list 230 continues to be displayed until input is received to select a highlighted recipient or until an input is received indicating a cancellation of the recipient selection process. In the example shown in FIG. 11b, "Thomas (Work)" is not the desired recipient.

Referring to FIG. 11c, mobile device 10 detects input to scroll or otherwise move cursor 232 to "Thomas Meechem" in dropdown list 230. Upon highlighting "Thomas Meechem" message history 304 between the user of mobile device 10 and "Thomas Meechem" is displayed. Based on the message history 304, the user, in this example, determines that "Thomas Meechm" is the desired recipient and, thus, selects "Thomas Meechem" from dropdown list 230 by, for example, actuating an input mechanism of mobile device 10.

Referring to FIG. 11d, the selected recipient "Thomas Meechem" is shown in recipient field 212 and message history 304 is shown in the message history display area 214. The user of mobile device 10 is able to begin drafting a message in message composition field 216, knowing the context of the message and being assured that the recipient is correct.

Mobile device 10 is configured to receive text input into recipient field 212. Upon receiving text input, a list of candidate recipients corresponding to the text input into the recipient field is displayed in a list, such as, for example, dropdown list 230, a popup list or the like. The list, for example, comprises the desired recipient and other recipients having some correspondence to the input text. Upon detecting an initial interest in one of the candidate recipients, such as, for example, through the detection that cursor 232 has been positioned over a recipient in the list or by detecting a single click or touch of a recipient in the list, or some other similar input mechanism, mobile device 10 displays the message history between the user of mobile device 10 and the recipient of interest in message history display area 214. Mobile device 10 is further configured to receive a conclusive selection input, such as, for example, through the detection of an actuation input while an entry in the list is highlighted or by detecting a double click or touch of a recipient in the list, or some other similar input mechanism, which selects one of the recipients from the list for inclusion as a recipient in recipient field 212. In another example, before receiving the conclusive selection input selecting the desired recipient, mobile device 10 detects a second initial interest in another one of the candidate recipients and displays a second message history between the user and the another one of the candidate recipients in message history display area 214.

Figure 12:
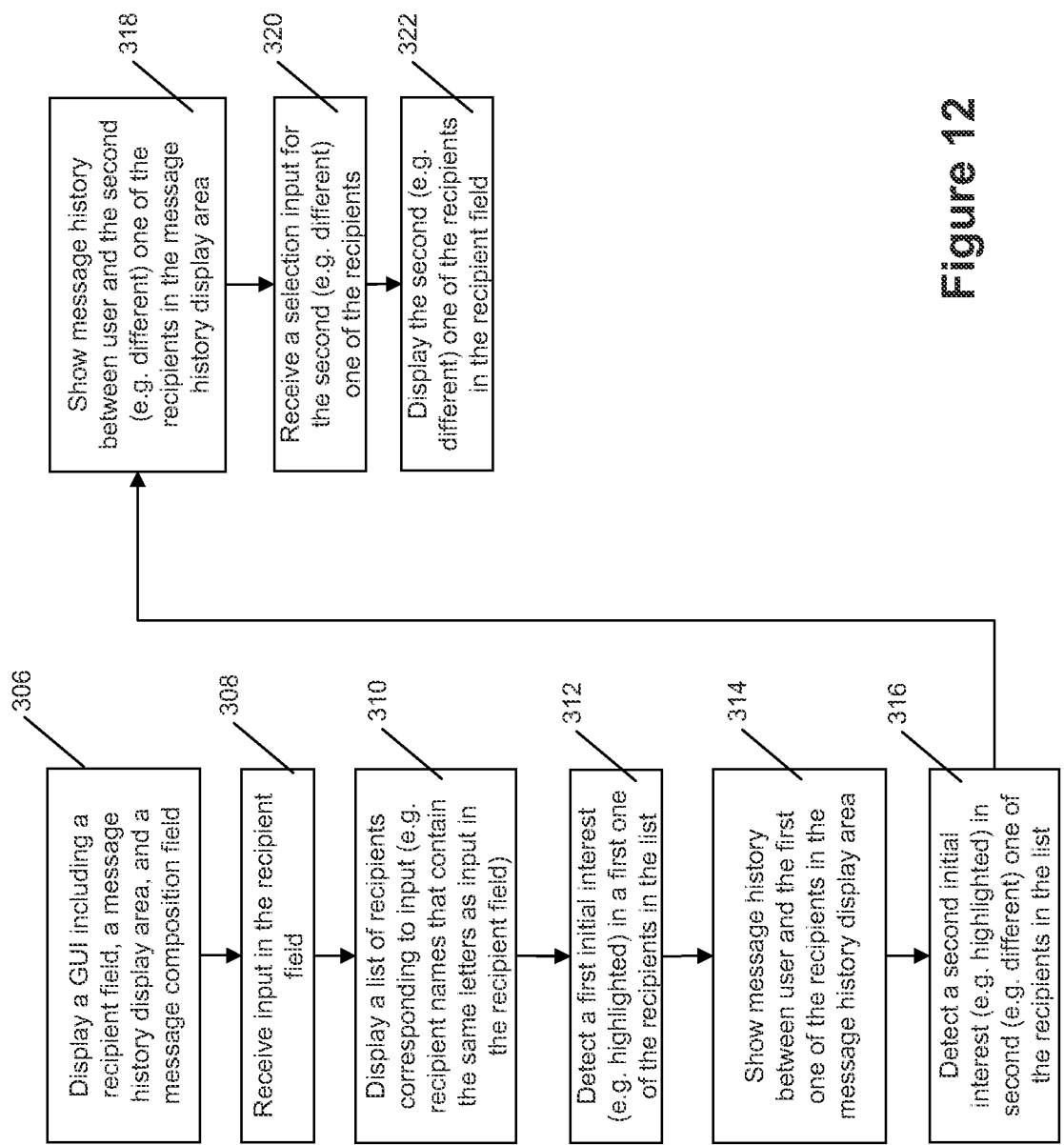
FIG. 12 is a flow diagram illustrating example computer executable instructions for dynamically displaying message history for a recipient, when a cursor moves over the recipient's name.

FIG. 12 provides example computer executable instructions for dynamically showing message history with reference to elements corresponding to FIGS. 11a, 11b, 11c, and 11d. At block 306, mobile device 10 displays a GUI including recipient field 212, message history display area 214, and message composition field 216. At block 308, an input is received into recipient field 212, the input signifying at least a portion of information related to a desired recipient. At block 310 a list of recipients, each of whom has some correspondence to the input is displayed. For example, the list of recipients is populated with potential recipients from, for example, contacts 34 of FIG. 6, that have names that include the same letters as the input. In another example, the list of recipients is populated with recipients from contacts 34 (of FIG. 6) that have any information (e.g., company, phone number, address) that corresponds to the input. At block 312 mobile device 10 detects a first initial interest in a first one of the recipient in the list through, for example, detection of input to highlight the recipient. At block 314, the message history between the user of mobile device 10 and the first recipient of interest is shown in message history display area 214. At block 316, mobile device 10 then detects a second initial interest in a second one of the recipients in the list. At block 318, mobile device 10 shows the message history between the user and the second recipient of interest. At block 320, a selection input is received in association with the second recipient of interest, thereby selecting the second one of the recipients as an actual recipient for the message that is being composed. At block 322, the second one of the recipients is displayed in recipient field 212.

Figure 13:
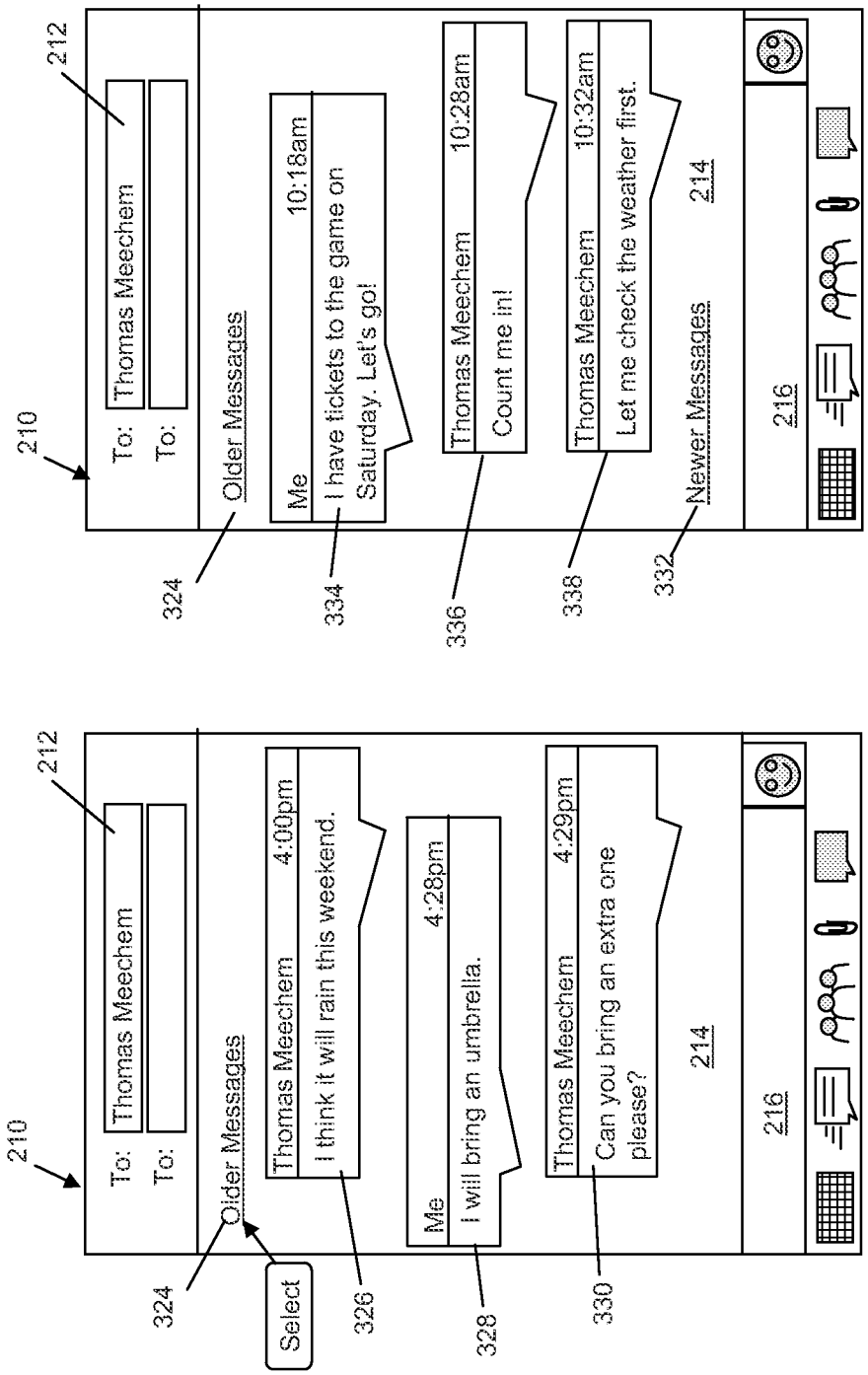
FIGS. 13*a* and 13*b* are example GUIs for composing a message, such that the GUI shows that older and newer messages can be shown by selecting a link.

Turning to FIGS. 13a and 13b, example GUIs are shown that demonstrate the display of different portions of message histories through the selection of a button or a link.

Referring to FIG. 13a, a recipient "Thomas Meechem" has been selected in recipient field 212, and a portion of the message history (comprising messages 326, 328 and 330) is shown in the message history display area 214. There is also a link 324, which, when selected, causes older messages from a conversation to be displayed in message history display area 214. Link 324 allows navigation between older and newer messages in the message history.

In one example, link 324 reduces the number of messages to scroll over when navigating between recipient field 212 and message composition field 216. For example if input is currently being entered into message composition field 216, and a switch is desired to input text into recipient field 212, in some examples it is necessary to scroll through all of the messages displayed in message history display area 214. In some examples, the messages in message history display area 214 are displayed in a continuous fashion and if there are many messages in the message history, it may be necessary to scroll through all of the messages, up to the earliest message, before being able to navigate to recipient field 212. In the example shown in FIGS. 13a and 13b, navigating between text composition field 216 and recipient field 212 does not require scrolling through many messages since only the most recent messages (330, 328, 326) are included in message history display area 214 instead of the entire message history. Segmenting message history through the use of a mechanism such as link 324 alleviates some inconveniences associated with having to scroll through an entire message history, thereby potentially saving time and reducing the number of scrolling actions by the user in conversations having many messages.

Upon detecting a selection of link 324 of FIG. 13a, mobile device 10 displays GUI 210 of FIG. 13b. In FIG. 13b, older messages 334, 336, and 338 are displayed in message history display area 214. Link 324 of FIG. 13b can be actuated to navigate to a set of even older messages. Link 332 can be actuated to navigate to a set of newer messages, for example back to messages 326, 328 and 330 of FIG. 13a. Embodiments comprising links 324 and 332 permit mobile device 10 to display different (e.g. newer or older) portions of a conversation's message history within message history display area 214.

The message history shown in message history display area 214 is a portion of a complete message history between the user of mobile device 10 and the recipient. The message history shown in the message history display area 214 may be selected to be the most recent portion of the complete message history, and the link 324, when selected, navigates to an older portion of the complete message history.

Figure 14:
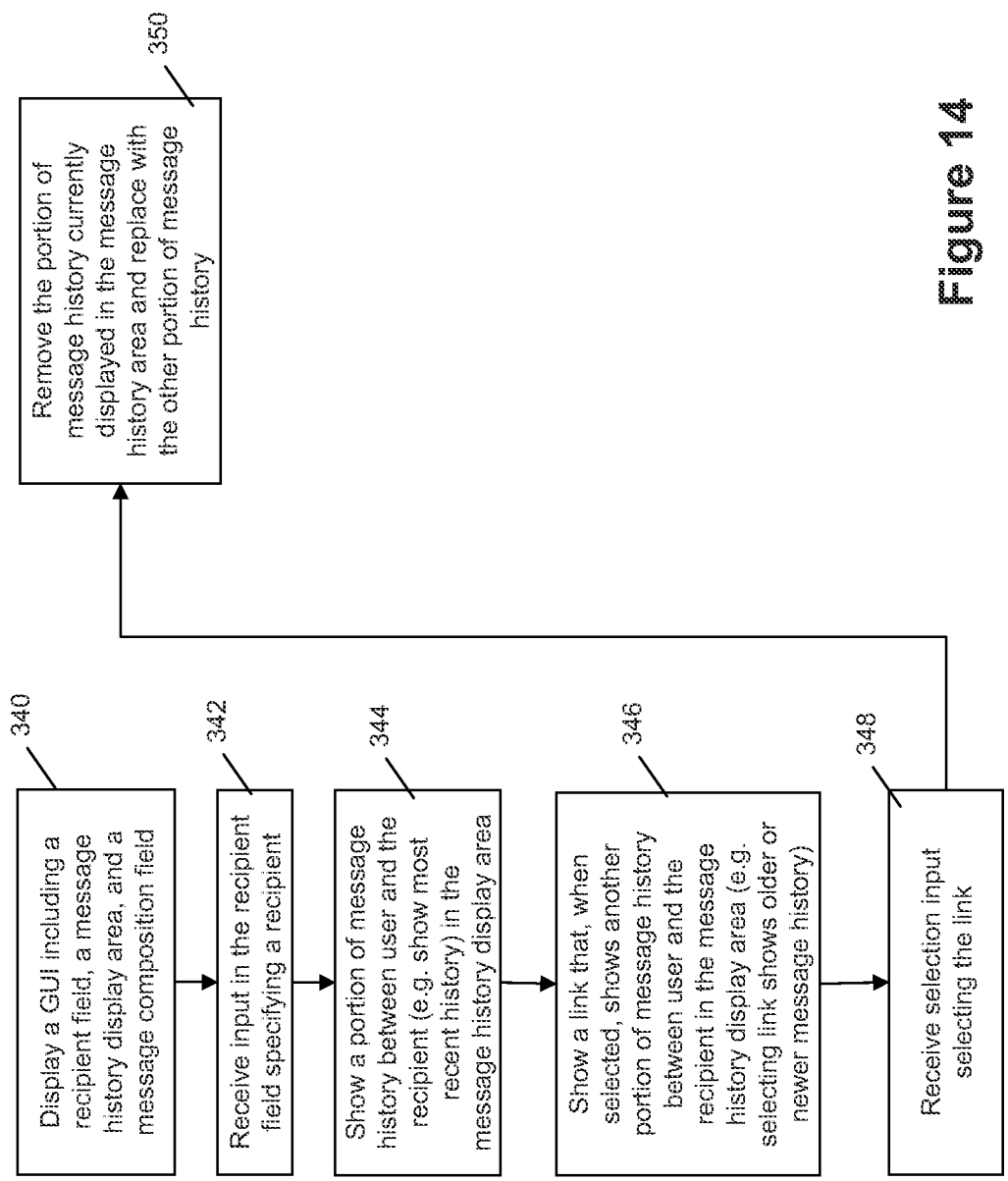
FIG. 14 is a flow diagram illustrating example computer executable instructions for showing different portions of message history by selecting a link.

Turning to FIG. 14, example computer executable instructions are provided for displaying different portions of a message history with reference to corresponding elements of FIGS. 13a and 13b. At block 340, mobile device 10 displays a GUI including recipient field 212, message history display area 214, and message composition field 216. At block 342, mobile device 10 receives an input into recipient field 212 specifying text for a recipient of the message being composed. At block 344, mobile device 10 shows a portion of the message history between a user of mobile device 10 and the recipient in message history display area 214. In one example, the most recent messages in the message history are shown. At block 346, link 324 is shown in association with the shown portion of the message history. Link 324, when selected, causes another portion of the message history to be shown in message history display area 214, such as, for example, a newer or older portion of the message history. At block 348, mobile device 10 receives a selection input selecting link 324. At block 350, mobile device 10 replaces the portion of the message history currently displayed in the message history display area 214 with the other portion of message history (e.g. the newer or older portion of the message history).

Figures 15A, 15B:
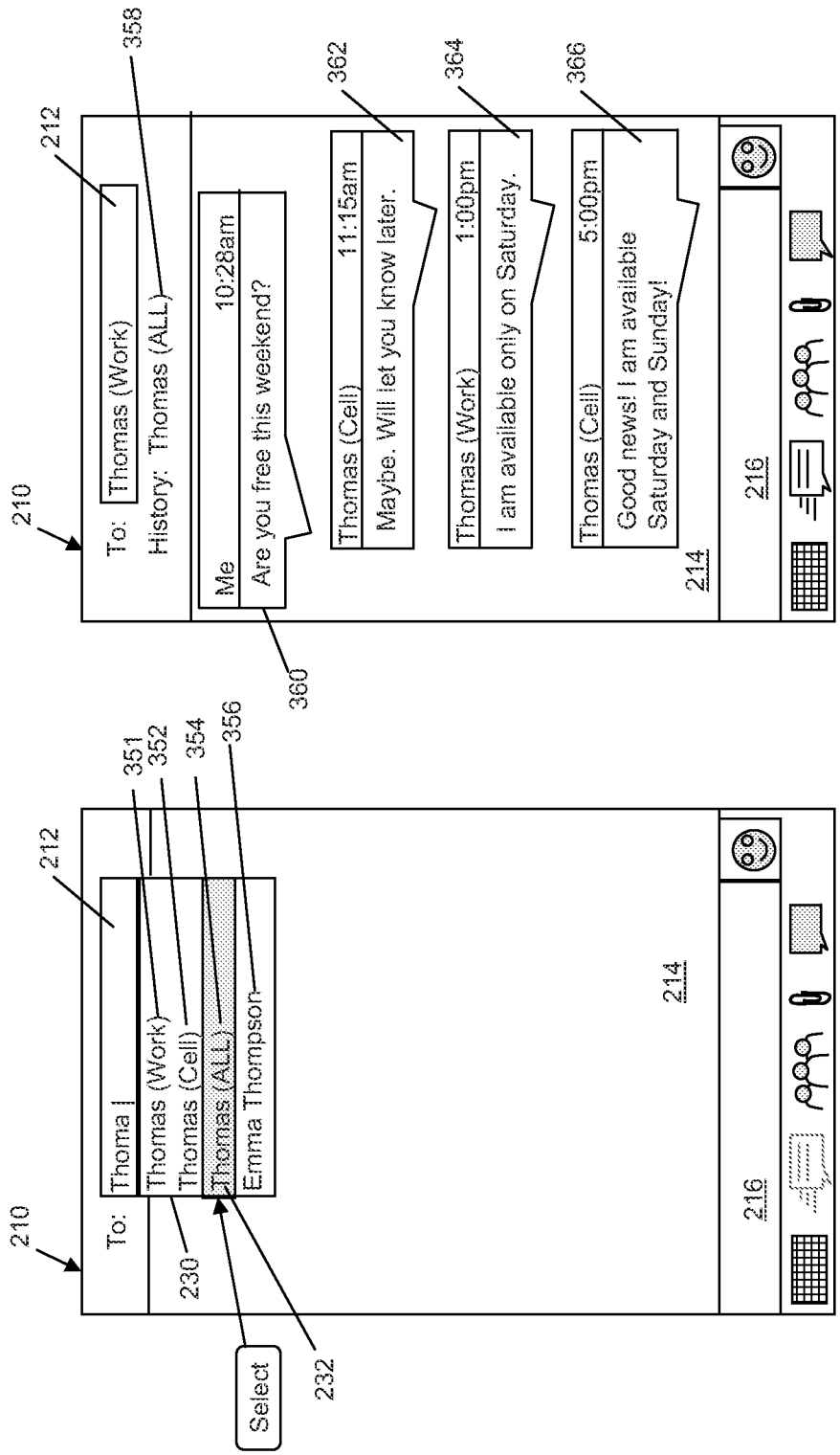
FIGS. 15*a* and 15*b* are example GUIs for composing a message, such that the GUI shows message history from different recipients can be displayed together.

Turning to FIGS. 15a and 15b, example GUIs are shown that demonstrate displaying message histories in a combined fashion for a single recipient that has multiple methods of communication. Some recipients, for example, may have multiple recipient contact addresses, such as a home phone number, a work phone number, a home email address, a work instant messaging address and the like.

Referring first to FIG. 15a, the text "Thoma" has been input into recipient field 212. Accordingly, dropdown list 230 is shown, including names of possible recipients which have a correspondence to the input text "Thoma", namely Thomas (Work) 351; Thomas (Cell) 352; Thomas (ALL) 354; and Emma Thompson 356. In this example, the contact Thomas may have multiple phone numbers, such as a work phone number and a cell phone number, or communication methods, such as work information for email and cell phone information for text messaging, which are denoted by the recipient names "Thomas (Work)" 350 and "Thomas (Cell)" 352. A message can be exchanged with either of these recipient names 351, 352 in order to communicate with the contact Thomas. The contact "Thomas" may also interchangeably send messages to the user from his work number and cell number. In some examples, viewing the messages from Thomas' work number or cell number in isolation may break the flow of the conversation and may lead to incomplete messages and it may therefore be desirable to view the message history from both the recipient names 351 and 352 together, to better understand the context.

In the example GUI 210 of FIG. 15a, recipient entry "Thomas (ALL)" 354 is included. Upon detecting aa selection of recipient entry 354 the combined message history from messages exchanged between the user and "Thomas (Work)" 350, and from messages exchanged between the user and "Thomas (Cell)" 352 is shown.

Upon selecting the recipient name "Thomas (ALL)" 354, referring to FIG. 15*b*, the message history (360, 362, 364, 366) from both "Thomas (Work)" 350 and "Thomas (Cell)" 352 is shown. A notification or status message 358 shows that the message history is from all the recipient names (or phone numbers) associated with the contact "Thomas". Recipient field 212 shows that messages will be sent to Thomas' work phone number, although this can be changed, for example, to Thomas' cell phone number.

Messages displayed in message history display area 214 of FIG. 15*b*, for example, are organized by chronological order. In FIG. 15*b*, a message 360 from the user is sent at 10:28 am. Then a message 362 from "Thomas (Cell)" (e.g. Thomas' cell phone) is received at 11:15 am. Then a message 364 from "Thomas (Work)" (e.g. Thomas' work phone) is received at 1:00 pm. This is followed by a message 366 received from "Thomas (Cell)" at 5:00 pm.

As seen from FIGS. 15*a* and 15*b*, example GUIs 210 enable the viewing of messages from a contact having multiple contact addresses (e.g. phone number, email address, instant messaging identification, etc.), in a unified manner. In this way, the user is able to continue a conversation with the same contact, even though the contact is using different devices, messaging protocols, messaging applications, or contact addresses at different times.

Figure 16:
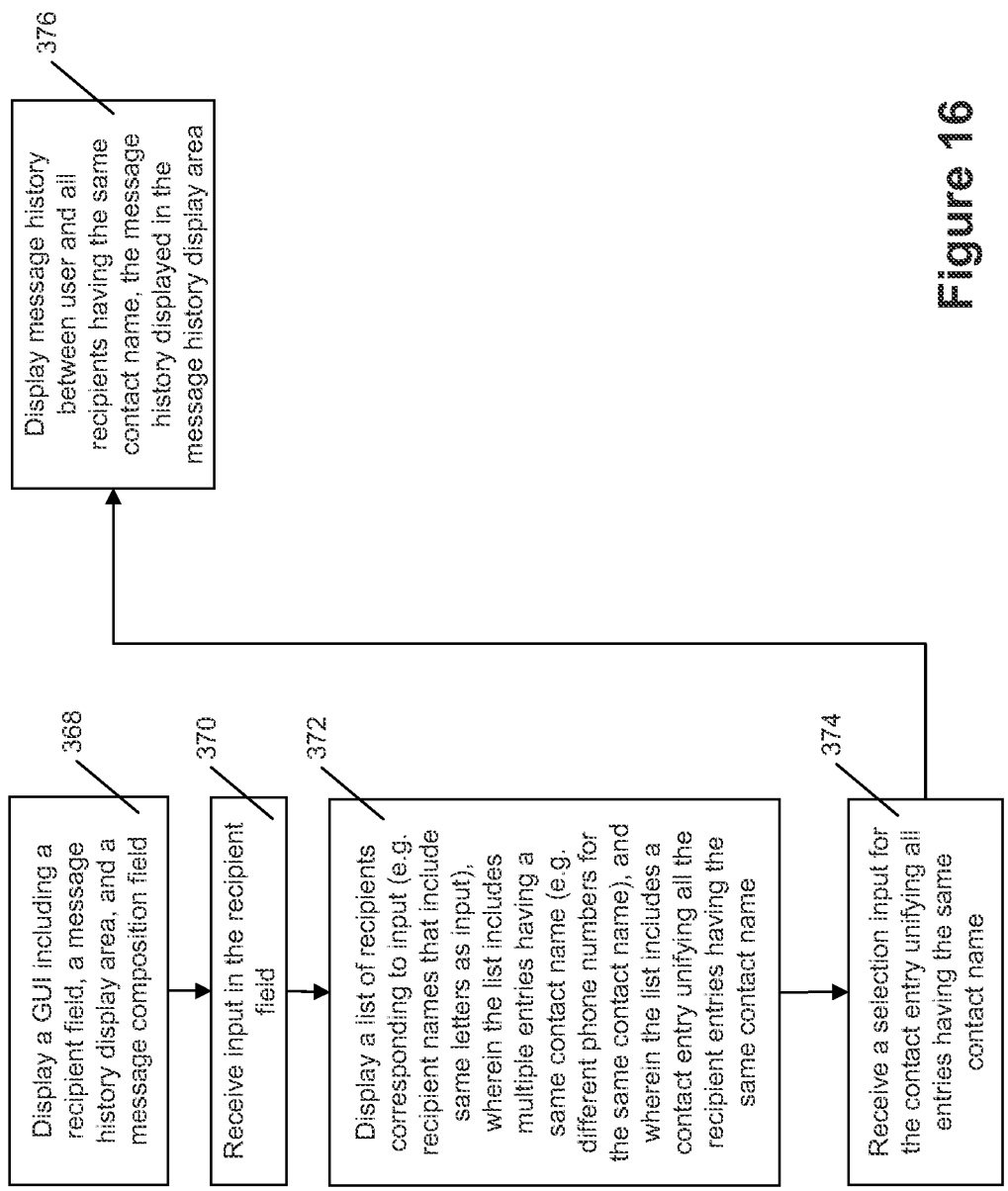
FIG. 16 is a flow diagram illustrating example computer executable instructions for displaying unified message history from different recipients in a message history display area.

FIG. 16 provides example computer executable instructions for combining the message histories for a single recipient having multiple contact pathways, with reference to corresponding elements of FIGS. 15*a* and 15*b*. At block 368, mobile device 10 displays GUI 210 including recipient field 212, message history display area 214, and message composition field 216. At block 370, mobile device 10 receives an input of text input into recipient field 212. Upon detection of the text input, mobile device 10 displays a list of recipients corresponding to the input at block 372. For example, the recipients names listed may include the same letters as the input. The list includes multiple entries for a single contact that has multiple methods of communication. For example, there may be multiple phone number entries for the same contact name. The list also includes a contact entry unifying multiple recipient entries for the single contact having multiple communication methods. At block 374, mobile device 10 receives a selection input for the contact entry unifying the multiple recipient entries for the single contact having multiple communication methods. At block 376, mobile device 10 displays the message history between the user of mobile device 10 and the selected single recipient, unified across each different communication method for the single contact. The combined message history is displayed in message history display area 214.

A specified recipient may unify multiple recipient contact addresses, and the message history displayed in such an example may include a combination of messages exchanged between the user and any one of the multiple recipient contact addresses. For example, each of the recipient contact addresses may have identical names associated with the contact entry.

Figure 17:
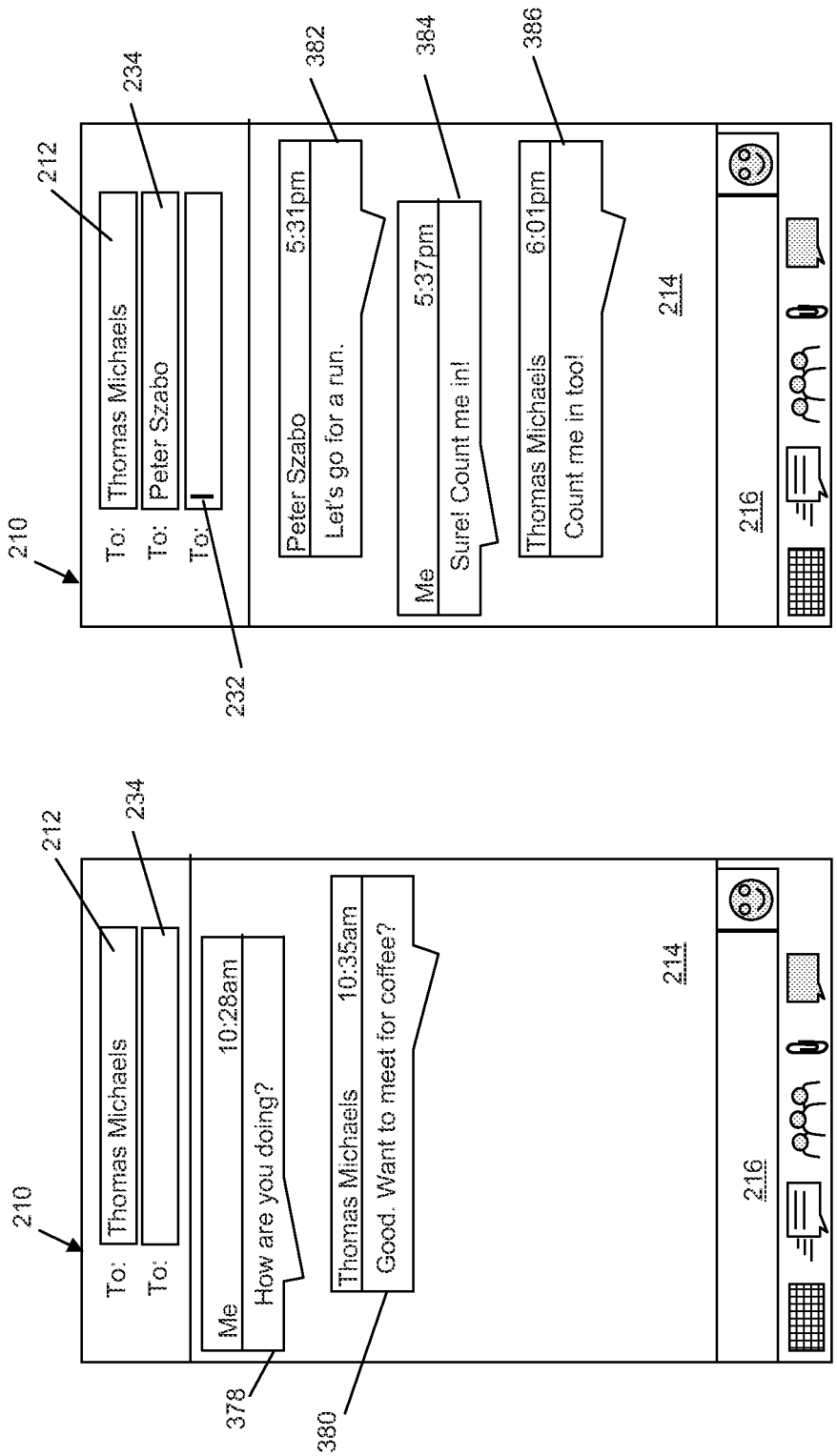
FIGS. 17*a* and 17*b* are example GUIs for composing a message, such that the GUI shows message history involving one set of recipients differs from message history involving a different set of recipients.

Turning to FIGS. 17*a* and 17*b*, example GUI 210*s* are shown displaying different message histories when switching between a recipient to a group of recipients. Referring to FIG. 17*a*, the user and a recipient "Thomas Michaels" may be in a messaging conversation in which they are the only participants. The messages 378 and 380 have previously been exchanged, as shown in message history display area 214.

As shown in to FIG. 17*b*, a second recipient, "Peter Szabo" is added in second recipient field 234. Upon detecting the addition of the second recipient, mobile device 10 updates the message history shown in message history display are 214 to reflect the messaging history of the group of recipients comprising the user of mobile device 10, Thomas Michaels and Peter Szabo. In the present example, the three participants (e.g. the user, Thomas Michaels, and Peter Szabo) were exchanging messages (382, 384, 386) amongst each other. Showing different message histories for different sets of recipients provides context for conversations. The example GUIs 210 of FIGS. 17*a* and 17*b* demonstrate functionality whereby a user of mobile device 10 is provided an accurate conversational context depending on the currently specified recipients of a message.

Figure 18:
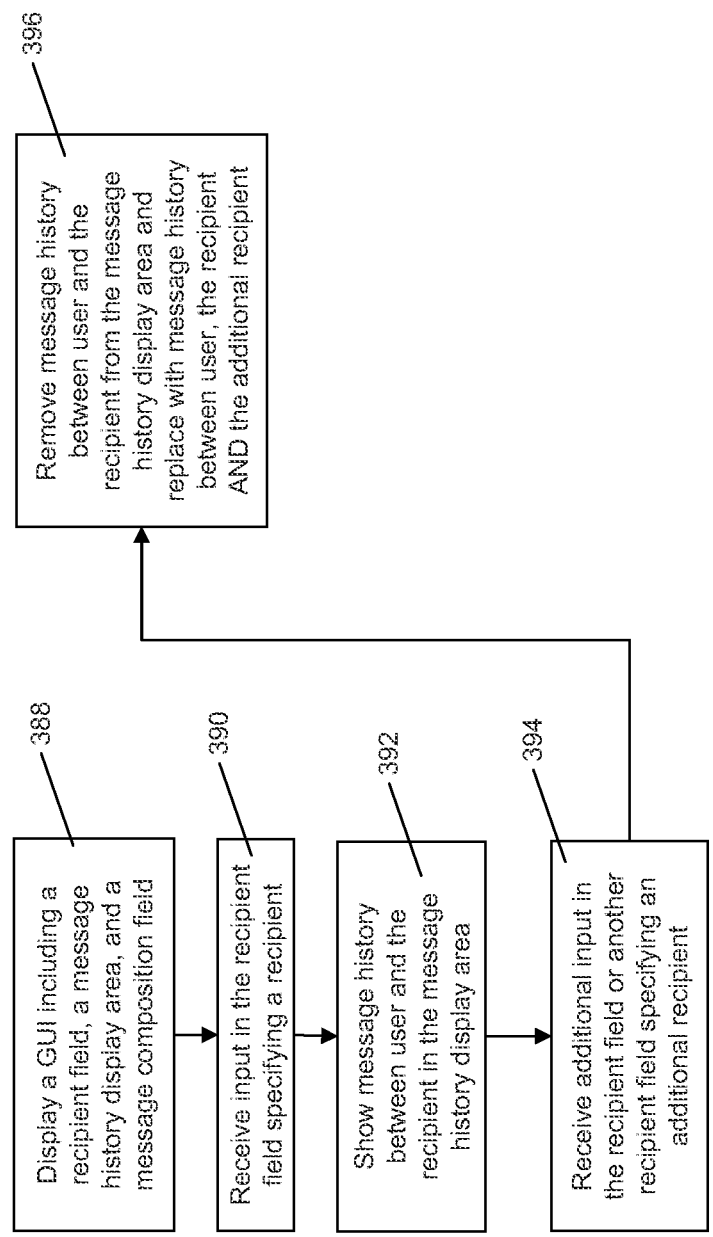
FIG. 18 is a flow diagram illustrating example computer executable instructions for showing the message history of one set of recipients and, upon modifying the recipients to a different set of recipients, showing a different message history.

Turning to FIG. 18, example computer executable instructions are provided for displaying different message histories based on the different set of recipients with reference to corresponding elements of FIGS. 17*a* and 17*b*. At block 388, mobile device 10 displays a GUI including recipient field 212, message history display area 214, and message composition field 216. At block 390 mobile device 10 receives an input of text into the recipient field 212 specifying a recipient. At block 392 the message history between the user of mobile device 10 and the recipient is retrieved from message histories 35 (of FIG. 1) and shown in message history display area 214. At block 394, an additional input of text into the second recipient field 234 is received, which specifies an additional recipient. At block 396, the message history between the user and the recipient displayed in message history display area 214 is switched to the message history between the user, the recipient and the additional recipient.

In one aspect, there is provided a method of operating a mobile device comprising: displaying a message composition application comprising a first recipient field, a message history display area, and a message composition field; detecting an input into the first recipient field for specifying a recipient; and upon detecting that the recipient has been specified: displaying a second recipient field; navigating application focus from the first recipient field to the second recipient field; and displaying a message history associated with the recipient in the message history display area.

In another aspect, there is provided a computer readable medium comprising computer executable instructions for displaying message history while composing a message, the computer executable instructions comprising: displaying a message composition application comprising a first recipient field, a message history display area, and a message composition field; detecting an input into the first recipient field for specifying a recipient; and upon detecting that the recipient has been specified: displaying a second recipient field; navigating application focus from the first recipient field to the second recipient field; and displaying a message history associated with the recipient in the message history display area.

In yet another aspect, there is provided a mobile device comprising a processor, a display, and memory, the memory comprising computer executable instructions for displaying message history on the display while composing a message, the computer executable instructions comprising: displaying a message composition application comprising a first recipient field, a message history display area, and a message composition field; detecting an input into the first recipient field for specifying a recipient; and upon detecting that the recipient has been specified: displaying a second recipient field; navigating application focus from the first recipient field to the second recipient field; and displaying a message history associated with the recipient in the message history display area.

The steps or operations in the flow charts described herein are just for example. There may be many variations to these steps or operations without departing from the spirit of the invention. For instance, the steps may be performed in a differing order, or steps may be added, deleted, or modified.

It can also be appreciated that the displays or screens described herein are just for example. There may be many variations to the configuration and arrangement of information and user interface controls without departing from the scope of the above principles. For instance, the information and the user interface controls may be in a differing order, or may be added, deleted, or modified.

Although the above has been described with reference to certain specific embodiments, various modifications thereof will be apparent to those skilled in the art without departing from the scope of the claims appended hereto.

What is claimed is:

1. A method of operating a mobile device comprising:
    displaying a message composition application comprising a user interface, the user interface comprising:
        a first recipient field;
        a message history display area separate from the first recipient field; and
        a message composition field separate from the message history display area and the first recipient field;
    receiving first text input via the first recipient field;
    displaying, in a first recipient dropdown list, candidate recipient addresses having names containing at least some letters that match the first text input in the first recipient field;
    selecting, from the first recipient dropdown list, a first one of the candidate recipient addresses as a first recipient;
    displaying, in the message history display area, a first message history comprising messages exchanged between the first recipient and a user of the mobile device in response to selecting the first recipient;
    displaying, in response to selecting the first recipient, a second recipient field, wherein the first recipient field is separate from the second recipient field;
    receiving second text input via the second recipient field;
    displaying, in a second recipient dropdown list, candidate recipient addresses having names containing at least some letters that match the second text input in the second recipient field;
    selecting, from the second recipient dropdown list, a second one of the candidate recipient addresses as a second recipient; and
    replacing, in the message history display area and in response to selecting the second recipient, the first message history with a second message history comprising group messages exchanged between each of the first recipient, the second recipient, and the user of the mobile device.

2. The method of claim 1, further comprising:
    receiving input into the message composition field before receiving the first text input via the first recipient field, wherein the message composition field maintains the input after receiving the first text input via the first recipient field and after receiving the second text input via the second recipient field.

3. The method of claim 1, further comprising:
    receiving input into the message composition field before receiving the first text input via the first recipient field; and
    sending, when the first recipient and the second recipient are not associated with a same recipient, a text message comprising the input in the message composition field to the first recipient and the second recipient.

4. The method of claim 1, further comprising navigating, in response to displaying the second recipient field, an application focus from the first recipient field to the second recipient field.

5. The method of claim 4, further comprising continuing to display the first recipient field and the second recipient field when the application focus has moved from the second recipient field to the message composition field.

6. A non-transitory computer readable medium comprising computer executable instructions that, when executed by a processor, cause a mobile device to:
    display a message composition application comprising a user interface, the user interface comprising:
        a first recipient field;
        a message history display area separate from the first recipient field; and
        a message composition field separate from the message history display area and the first recipient field;
    receive first text input via the first recipient field;
    display, in a first recipient dropdown list, candidate recipient addresses having names containing at least some letters that match the first text input in the first recipient field;
    select, from the first recipient dropdown list, a first one of the candidate recipient addresses as a first recipient;
    display, in the message history display area, a first message history comprising messages exchanged between the first recipient and a user of the mobile device in response to selecting the first recipient;
    display, in response to selecting the first recipient, a second recipient field, wherein the first recipient field is separate from the second recipient field;
    receive second text input via the second recipient field;
    display, in a second recipient dropdown list, candidate recipient addresses having names containing at least some letters that match the second text input in the second recipient field;
    select, from the second recipient dropdown list, a second one of the candidate recipient addresses as a second recipient; and
    replace, in the message history display area and in response to selecting the second recipient, the first message history a second message history comprising group messages exchanged between each of the first recipient, the second recipient, and the user of the mobile device.

7. The non-transitory computer readable medium of claim 6, wherein the computer executable instructions, when executed by the processor, further cause the mobile device to:
    receive input into the message composition field before receiving the first text input via the first recipient field, wherein the message composition field maintains the input after receiving the first text input via the first recipient field and after receiving the second text input via the second recipient field.

8. The non-transitory computer readable medium of claim 6, wherein the computer executable instructions, when executed by the processor, further cause the mobile device to:
    receive input into the message composition field before receiving the first text input via the first recipient field; and send, when the first recipient and the second recipient are not associated with a same recipient, a text message comprising the input in the message composition field to the first recipient and the second recipient.

9. The non-transitory computer readable medium of claim 6, wherein the computer executable instructions, when executed by the processor, further cause the mobile device to navigate, in response to displaying the second recipient field, an application focus from the first recipient field to the second recipient field.

10. The non-transitory computer readable medium of claim 9, wherein the computer executable instructions, when executed by the processor, further cause the mobile device to continue to display the first recipient field and the second recipient field when the application focus has moved from the second recipient field to the message composition field.

11. A mobile device comprising:
a memory configured to store computer executable instructions; and
a processor coupled to memory and configured to execute the computer executable instructions to cause the mobile device to:
display a message composition application comprising a user interface, the user interface comprising:
a first recipient field;
a message history display area separate from the first recipient field; and
a message composition field separate from the message history display area and the first recipient field;
receive first text input, input via the first recipient field;
display, in a first recipient dropdown list, candidate recipient addresses having names containing at least some letters that match the first text input in the first recipient field;
select, from the first recipient dropdown list, a first one of the candidate recipient addresses as a first recipient;
display, in the message history display area, a first message history comprising messages exchanged between the first recipient and a user of the mobile device in response to selecting the first recipient;
display, in response to selecting the first recipient, a second recipient field, wherein the first recipient field is separate from the second recipient field;
receive second text input via the second recipient field;
display, in a second recipient dropdown list, candidate recipient addresses having names containing at least some letters that match the second text input in the second recipient field;
select, from the second recipient dropdown list, a second one of the candidate recipient addresses as a second recipient; and
replace, in the message history display area and in response to selecting the second recipient, the first message history with a second message history comprising group messages exchanged between each of the first recipient, the second recipient, and the user of the mobile device.

12. The mobile device of claim 11, wherein the processor is further configured to execute the computer executable instructions to cause the mobile device to:
receive input into the message composition field before receiving the first text input via the first recipient field, wherein the message composition field maintains the input after receiving the first text input via the first recipient field and after receiving the second text input via the second recipient field.

13. The mobile device of claim 11, wherein the processor is further configured to execute the computer executable instructions to cause the mobile device to:
receive input into the message composition field before receiving the first text input via the first recipient field; and
send, when the first recipient and the second recipient are not associated with a same recipient, a text message comprising the input in the message composition field to the first recipient and the second recipient.

14. The mobile device of claim 11, wherein the processor is further configured to execute the computer executable instructions to cause the mobile device to navigate, in response to displaying the second recipient field, an application focus from the first recipient field to the second recipient field.

15. The mobile device of claim 14, wherein the processor is further configured to execute the computer executable instructions to cause the mobile device to continue to display the first recipient field and the second recipient field when the application focus has moved from the second recipient field to the message composition field.

* * * * *